(12) United States Patent
Ou et al.

(10) Patent No.: US 11,683,814 B2
(45) Date of Patent: Jun. 20, 2023

(54) METHOD AND APPARATUS FOR TRANSMISSION IN INACTIVE STATE IN A WIRELESS COMMUNICATION SYSTEM

(71) Applicant: ASUSTek Computer Inc., Taipei (TW)

(72) Inventors: Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/153,401

(22) Filed: Jan. 20, 2021

(65) Prior Publication Data

US 2021/0227575 A1 Jul. 22, 2021

Related U.S. Application Data

(60) Provisional application No. 62/983,833, filed on Mar. 2, 2020, provisional application No. 62/964,345, filed on Jan. 22, 2020, provisional application No. 62/964,628, filed on Jan. 22, 2020.

(51) Int. Cl.
*H04W 72/23* (2023.01)
*H04W 76/11* (2018.01)
*H04W 76/27* (2018.01)
*H04W 72/1273* (2023.01)

(52) U.S. Cl.
CPC ....... *H04W 72/23* (2023.01); *H04W 72/1273* (2013.01); *H04W 76/11* (2018.02); *H04W 76/27* (2018.02)

(58) Field of Classification Search
None
See application file for complete search history.

(56) References Cited

U.S. PATENT DOCUMENTS

2018/0092125 A1* 3/2018 Sun .................. H04W 74/02
2018/0199359 A1* 7/2018 Cao .................. H04L 5/0096
2018/0288746 A1* 10/2018 Zhang ............... H04L 1/0031
(Continued)

FOREIGN PATENT DOCUMENTS

WO WO-2020032530 A1 * 2/2020
WO 2020063909 A1 4/2020

OTHER PUBLICATIONS

3GPP 38.321 "5G NR; Medium Access Control (MAC) Protocol Specification", dated Apr. 2019, (Year: 2019).*
Intel Corporation, "UL Data Transmission Procedures in NR", 3GPP TSG RAN WG1 NR#3, R1-1716323, Agenda item 6.3.3.4, Document for Discussion and Decision, Sep. 18-21, 2017, Nagoya Japan.
(Continued)

*Primary Examiner* — Jamaal Henson
(74) *Attorney, Agent, or Firm* — Cooper Legal Group LLC

(57) ABSTRACT

A method and apparatus are disclosed. In an example from the perspective of a User Equipment (UE), the UE receives, via a Radio Resource Control (RRC) message, a resource configuration of a first configured grant to be used in RRC inactive state. The UE performs a first new transmission using the first configured grant in RRC inactive state. After the performing the first new transmission, the UE receives an uplink grant in RRC inactive state via Physical Downlink Control Channel (PDCCH). The UE determines whether the uplink grant is for performance of a second new transmission or for performance of a first retransmission. The UE performs the second new transmission using the uplink grant in RRC inactive state if the UE determines that the uplink grant is for performance of the second new transmission.

21 Claims, 16 Drawing Sheets

(56) References Cited

U.S. PATENT DOCUMENTS

| | | | |
|---|---|---|---|
| 2018/0323909 A1* | 11/2018 | Ying | H04L 1/1822 |
| 2018/0368117 A1* | 12/2018 | Ying | H04L 1/0061 |
| 2019/0215862 A1* | 7/2019 | Kim | H04W 74/0841 |
| 2019/0215863 A1* | 7/2019 | Kim | H04W 36/0027 |
| 2019/0253197 A1 | 8/2019 | Babaei et al. | |
| 2019/0349983 A1 | 11/2019 | Loehr et al. | |
| 2020/0107268 A1* | 4/2020 | Lee | H04W 52/0229 |
| 2020/0107295 A1 | 4/2020 | Lee et al. | |
| 2020/0267696 A1* | 8/2020 | Li | H04W 72/56 |
| 2021/0153086 A1* | 5/2021 | Kim | H04W 36/08 |
| 2021/0259040 A1* | 8/2021 | Babaei | H04W 76/27 |
| 2021/0298085 A1* | 9/2021 | Lee | H04W 74/0833 |
| 2021/0298108 A1* | 9/2021 | Wu | H04W 76/19 |
| 2021/0307055 A1* | 9/2021 | Tsai | H04B 17/327 |

OTHER PUBLICATIONS

ZTE, "Procedures Related to NOMA", 3GPP TSG RAN WG1 Meeting #94, R1-1808153, Agenda Item 7.2.1.3, Document for Discussion/Decision, Aug. 20-24, 2018, Gothenburg, Sweden.
Corresponding European Patent Application No. 21152430.1, Extended European Search Report dated Jun. 16, 2021.
Corresponding Korean Patent Application No. 10-2021-0008092, Korean Intellectual Property Office Opinion dated Jan. 25, 2023, 9 pages.
Huawei, HiSilicon: "Further Views on Rel-17 Small Data Work Area", 3GPP TSG RAN Meeting #85, RP-191833, Newport Beach, US, Sep. 16-20, 2019, 5 pages.

* cited by examiner

METHOD AND APPARATUS FOR TRANSMISSION IN INACTIVE STATE IN A WIRELESS COMMUNICATION SYSTEM

CROSS-REFERENCE TO RELATED APPLICATIONS

The present application claims the benefit of U.S. Provisional Patent Application Ser. No. 62/964,345 filed on Jan. 22, 2020, the entire disclosure of which is incorporated herein in its entirety by reference. The present application also claims the benefit of U.S. Provisional Patent Application Ser. No. 62/964,628 filed on Jan. 22, 2020, the entire disclosure of which is incorporated herein in its entirety by reference. The present application also claims the benefit of U.S. Provisional Patent Application Ser. No. 62/983,833 filed on Mar. 2, 2020, the entire disclosure of which is incorporated herein in its entirety by reference.

FIELD

This disclosure generally relates to wireless communication networks, and more particularly, to a method and apparatus for transmission in inactive state in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives, via a Radio Resource Control (RRC) message, a resource configuration of a first configured grant to be used in RRC inactive state. The UE performs a first new transmission using the first configured grant in RRC inactive state. After the performing the first new transmission, the UE receives an uplink grant in RRC inactive state via Physical Downlink Control Channel (PDCCH). The UE determines whether the uplink grant is for performance of a second new transmission or for performance of a first retransmission. The UE performs the second new transmission using the uplink grant in RRC inactive state if the UE determines that the uplink grant is for performance of the second new transmission.

In an example from the perspective of a UE, the UE receives, via a RRC message, a resource configuration of a first configured grant to be used in RRC inactive state. The UE performs a first new transmission using the first configured grant in RRC inactive state. After the performing the first new transmission, the UE receives an uplink grant in RRC inactive state via PDCCH. The UE determines whether the uplink grant is for performance of a second new transmission or for performance of a first retransmission. The UE performs the second new transmission using the uplink grant in RRC inactive state based on a determination that the uplink grant is for performance of the second new transmission.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP RP-193252, "Work Item on NR small data transmissions in INACTIVE state", ZTE Corporation; 3GPP TS 38.331 V15.8.0, "NR, RRC protocol specification"; 3GPP TS 38.300 V16.0.0, 3GPP TSG RAN NR and NG-RAN overall description; stage 2 (Release 16); 3GPP TS 38.321 V15.8.0, "NR, MAC protocol specification". The standards and documents listed above are hereby expressly incorporated by reference in their entirety.

Figure 1:
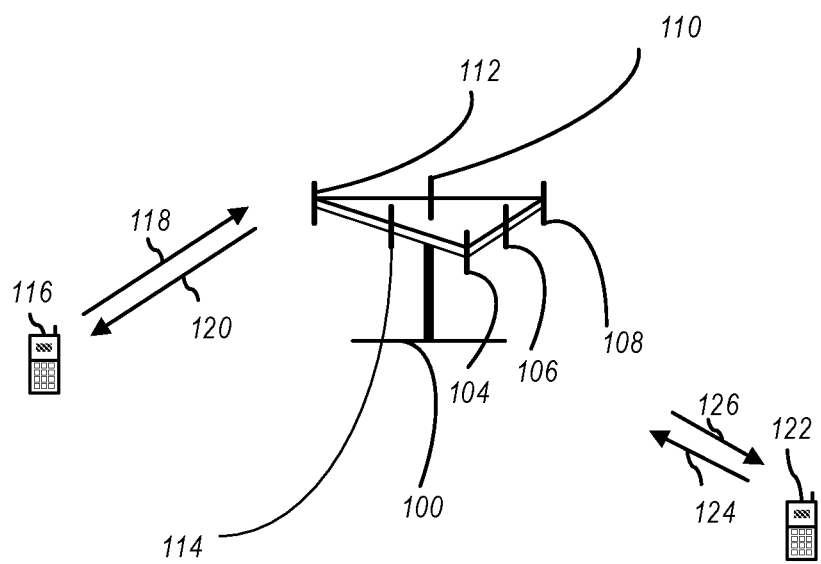
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
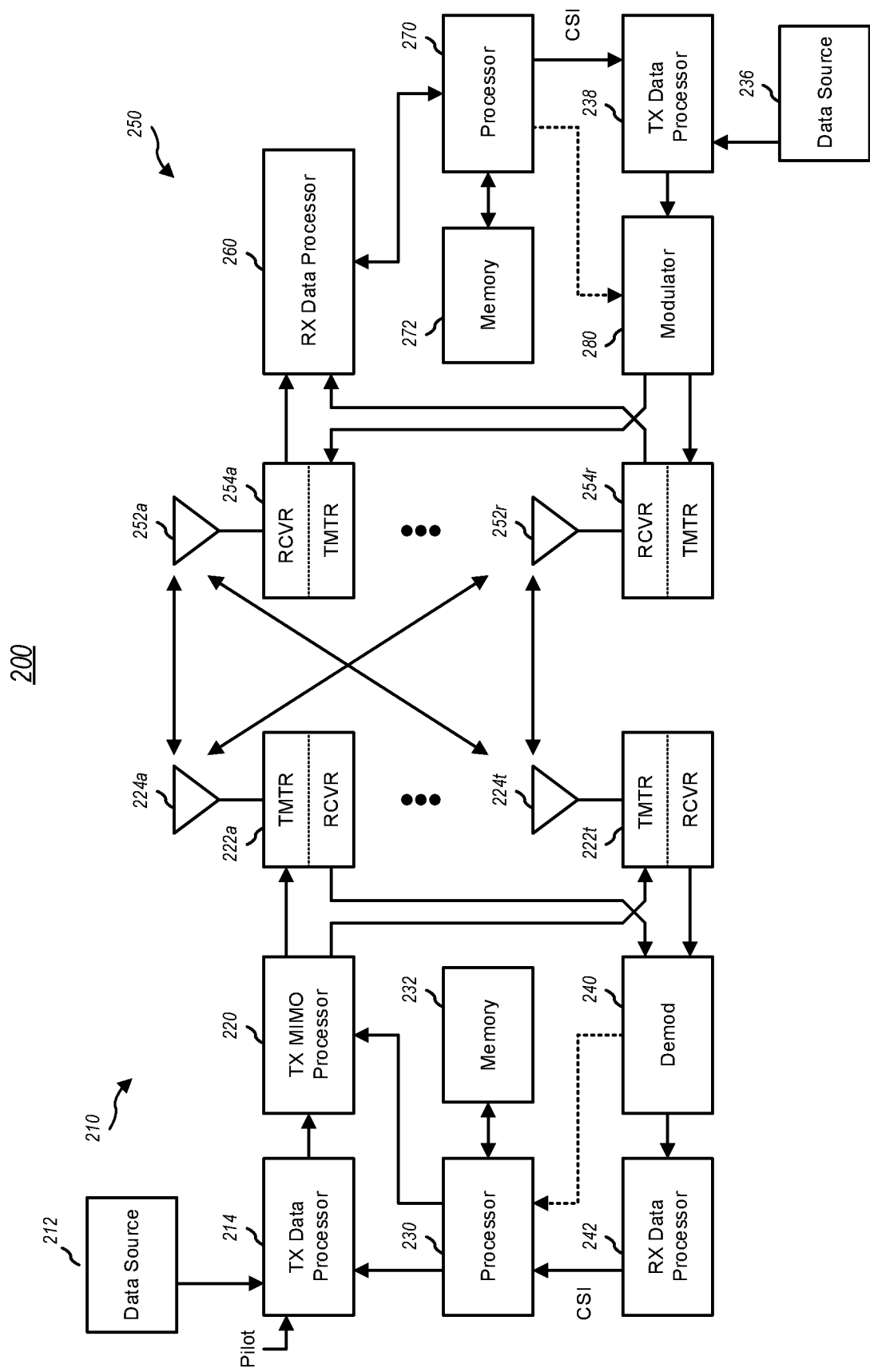
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250.

Processor 230 may then determine which pre-coding matrix to use for determining the beamforming weights and may then process the extracted message.

Figure 3:
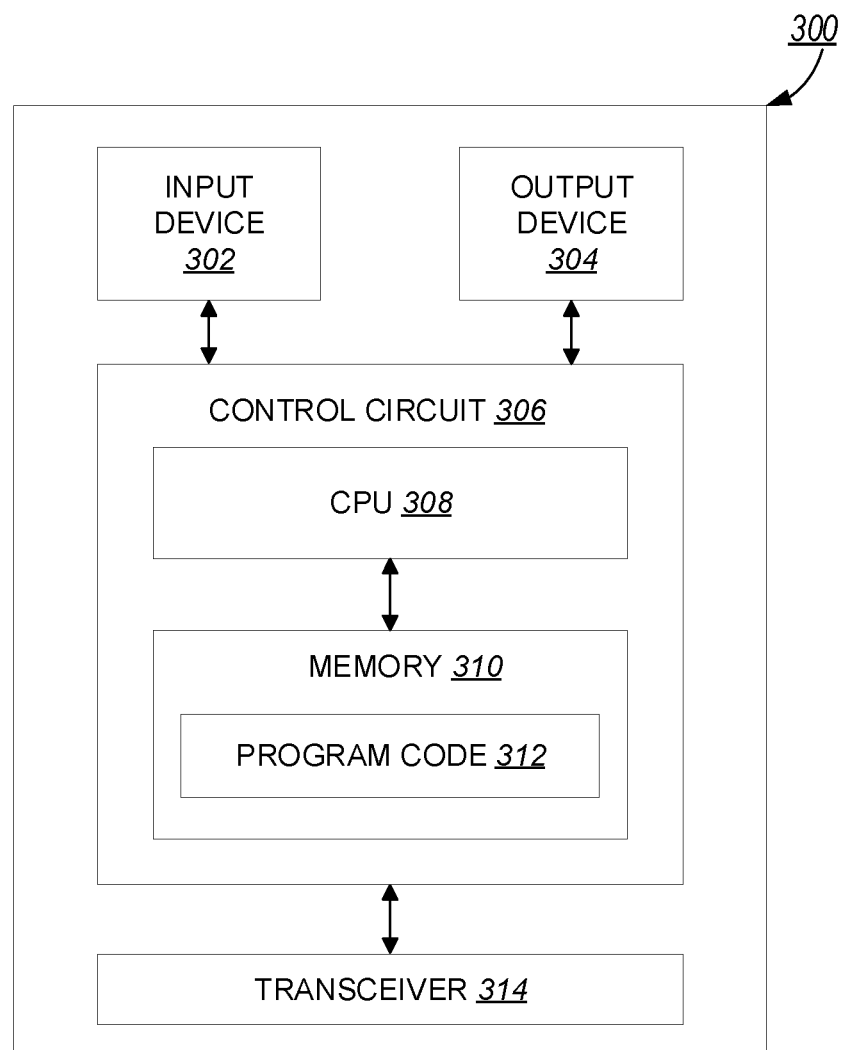
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
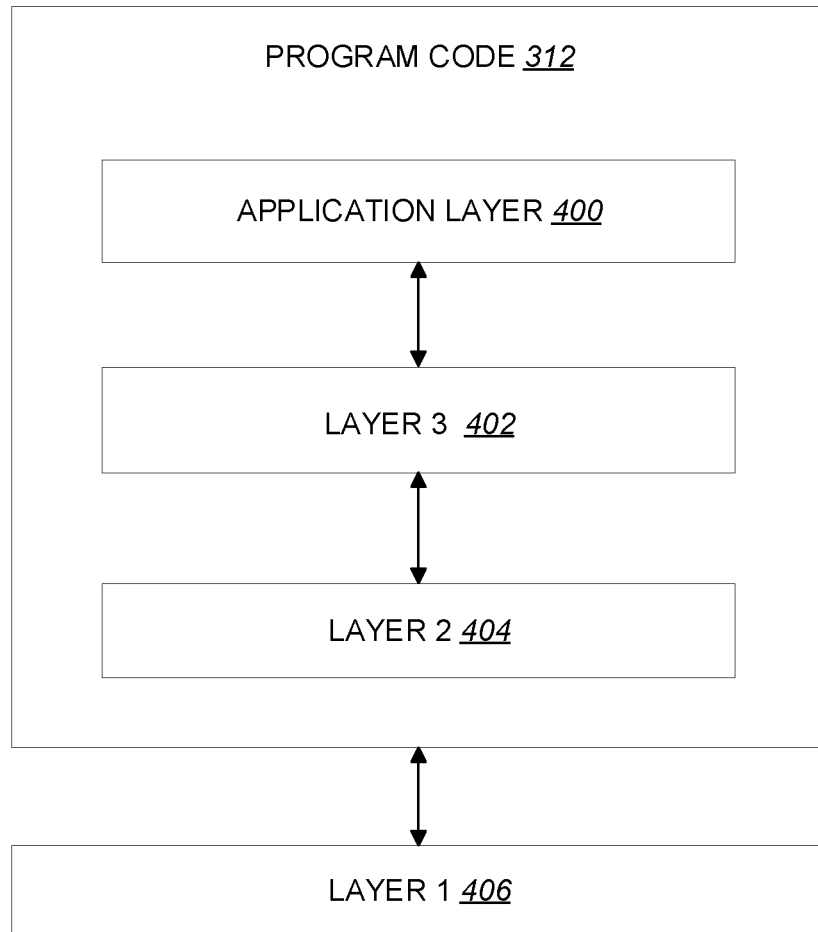
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP RP-193252 has been approved in RAN #86. Parts of 3GPP RP-193252 are quoted below:

3 Justification

NR supports RRC_INACTIVE state and UEs with infrequent (periodic and/or non-periodic) data transmission are generally maintained by the network in the RRC_INACTIVE state. Until Rel-16, the RRC_INACTIVE state doesn't support data transmission. Hence, the UE has to resume the connection (i.e. move to RRC_CONNECTED state) for any DL (MT) and UL (MO) data. Connection setup and subsequently release to INACTIVE state happens for each data transmission however small and infrequent the data packets are. This results in unnecessary power consumption and signalling overhead.

Specific examples of small and infrequent data traffic include the following use cases:
  Smartphone applications:
    Traffic from Instant Messaging services (whatsapp, QQ, wechat etc)
    Heart-beat/keep-alive traffic from IM/email clients and other apps
    Push notifications from various applications
  Non-smartphone applications:
    Traffic from wearables (periodic positioning information etc)
    sensors (Industrial Wireless Sensor Networks transmitting temperature, pressure readings periodically or in an event triggered manner etc)
    smart meters and smart meter networks sending periodic meter readings As noted in 3GPP TS 22.891, the NR system shall:
  be efficient and flexible for low throughput short data bursts
  support efficient signalling mechanisms (e.g. signalling is less than payload)
  reduce signalling overhead in general Signalling overhead from INACTIVE state UEs for small data packets is a general problem and will become a critical issue with more UEs in NR not only for network performance and efficiency but also for the UE battery performance. In general, any device that has intermittent small data packets in INACTIVE state will benefit from enabling small data transmission in INACTIVE.

The key enablers for small data transmission in NR, namely the INACTIVE state, 2-step, 4-step RACH and configured grant type-1 have already been specified as part of Rel-15 and Rel-16. So, this work builds on these building blocks to enable small data transmission in INACTIVE state for NR.

4 Objective

This work item enables small data transmission in RRC_INACTIVE state as follows:
  For the RRC_INACTIVE state:
    UL small data transmissions for RACH-based schemes (i.e. 2-step and 4-step RACH):
      General procedure to enable UP data transmission for small data packets from INACTIVE state (e.g. using MSGA or MSG3) [RAN2]
      Enable flexible payload sizes larger than the Rel-16 CCCH message size that is possible currently for INACTIVE state for MSGA and MSG3 to support UP data transmission in UL (actual payload size can be up to network configuration) [RAN2]
      Context fetch and data forwarding (with and without anchor relocation) in INACTIVE state for RACH-based solutions [RAN2, RAN3]
    Note 1: The security aspects of the above solutions should be checked with SA3
    Transmission of UL data on pre-configured PUSCH resources (i.e. reusing the configured grant type 1)—when TA is valid
      General procedure for small data transmission over configured grant type 1 resources from INACTIVE state [RAN2]
      Configuration of the configured grant type 1 resources for small data transmission in UL for INACTIVE state [RAN2]

In NR, two types of configured grants, discussed in 3GPP TS 38.300 V16.0.0, are defined for uplink scheduling. Parts of 3GPP TS 38.300 V16.0.0 are quoted below:

10.3 Uplink Scheduling

In the uplink, the gNB can dynamically allocate resources to UEs via the C-RNTI on PDCCH(s). A UE always monitors the PDCCH(s) in order to find possible grants for uplink transmission when its downlink reception is enabled (activity governed by DRX when configured). When CA is configured, the same C-RNTI applies to all serving cells.

In addition, with Configured Grants, the gNB can allocate uplink resources for the initial HARQ transmissions to UEs. Two types of configured uplink grants are defined:
  With Type 1, RRC directly provides the configured uplink grant (including the periodicity).
  With Type 2, RRC defines the periodicity of the configured uplink grant while PDCCH addressed to CS-RNTI can either signal and activate the configured uplink grant, or deactivate it; i.e. a PDCCH addressed to CS-RNTI indicates that the uplink grant can be implicitly reused according to the periodicity defined by RRC, until deactivated.

The dynamically allocated uplink transmission overrides the configured uplink grant in the same serving cell, if they overlap in time. Otherwise an uplink transmission according to the configured uplink grant is assumed, if activated. Retransmissions other than repetitions are explicitly allocated via PDCCH(s).

When CA is configured, at most one configured uplink grant can be signalled per serving cell. When BA is configured, at most one configured uplink grant can be signalled per BWP. On each serving cell, there can be only one configured uplink grant active at a time. A configured uplink grant for one serving cell can either be of Type 1 or Type 2. For Type 2, activation and deactivation of configured uplink grants are independent among the serving cells. When SUL is configured, a configured uplink grant can only be signalled for one of the 2 ULs of the cell.

In NR Radio Resource Control (RRC) specification, a configuration of configured grant type 1 or type 2 could be provided to a UE, such as discussed in 3GPP TS 38.331 V15.8.0. Parts of 3GPP TS 38.331 V15.8.0 are quoted below:

ConfiguredGrantConfig

The IE ConfiguredGrantConfig is used to configure uplink transmission without dynamic grant according to two possible schemes. The actual uplink grant may either be configured via RRC (type 1) or provided via the PDCCH (addressed to CS-RNTI) (type 2).

```
-- ASN1START
-- TAG-CONFIGUREDGRANTCONFIG-START
ConfiguredGrantConfig ::=            SEQUENCE {
    frequencyHopping                     ENUMERATED { intraSlot,
interSlot }                                  OPTIONAL, -- Need S
    cg-DMRS-Configuration            DMRS-UplinkConfig,
    mcs-Table                        ENUMERATED {qam256,
qam64LowSE}                                  OPTIONAL, -- Need S
    mcs-TableTransformPrecoder       ENUMERATED {qam256,
qam64LowSE}                                  OPTIONAL, -- Need S
    uci-OnPUSCH                      SetupRelease { CG-UCI-OnPUSCH
}                                            OPTIONAL, -- Need M
    resourceAllocation               ENUMERATED {
resourceAllocationType0, resourceAllocationType1, dynamicswitch },
    rbg-Size                         ENUMERATED {config2}
OPTIONAL, -- Need S
    powerControlLoopToUse            ENUMERATED {n0, n1},
    p0-PUSCH-Alpha                   P0-PUSCH-AlphaSetId,
    transformPrecoder                ENUMERATED {enabled, disabled}
OPTIONAL, -- Need S
    nrofHARQ-Processes               INTEGER(1..16),
    repK                             ENUMERATED {n1, n2, n4, n8},
    repK-RV                          ENUMERATED {s1-0231, s2-0303,
s3-0000}                                     OPTIONAL, -- Need R
    periodicity                      ENUMERATED {
                                         sym2, sym7, sym1x14,
sym2x14, sym4x14, sym5x14, sym8x14, sym10x14, sym16x14, sym20x14,
                                         sym32x14, sym40x14,
sym64x14, sym80x14, sym128x14, sym160x14, sym256x14, sym320x14,
sym512x14,
                                         sym640x14, sym1024x14,
sym1280x14, sym2560x14, sym5120x14,
                                         sym6, sym1x12,
sym2x12, sym4x12, sym5x12, sym8x12, sym10x12, sym16x12, sym20x12,
sym32x12,
                                         sym40x12, sym64x12,
sym80x12, sym128x12, sym160x12, sym256x12, sym320x12, sym512x12,
sym640x12,
                                         sym1280x12, sym2560x12
    },
    configuredGrantTimer             INTEGER (1..64)
OPTIONAL, -- Need R
    rrc-ConfiguredUplinkGrant        SEQUENCE {
        timeDomainOffset                 INTEGER (0..5119),
        timeDomainAllocation             INTEGER (0..15),
        frequencyDomainAllocation        BIT STRING (SIZE (18)),
        antennaPort                      INTEGER (0..31),
        dmrs-SeqInitialization           INTEGER (0..1)
OPTIONAL, -- Need R
        precodingAndNumberOfLayers       INTEGER (0..63),
        srs-ResourceIndicator            INTEGER (0..15)
OPTIONAL, -- Need R
        mcsAndTBS                        INTEGER (0..31),
        frequencyHoppingOffset           INTEGER (1..
maxNrofPhysicalResourceBlocks-1)             OPTIONAL, -- Need
R
        pathlossReferenceIndex           INTEGER
(0..maxNrofPUSCH-PathlossReferenceRSs-1),
        ...
    }
```

```
        OPTIONAL, -- Need R
          ...
    }
    CG-UCI-OnPUSCH ::= CHOICE {
        dynamic                    SEQUENCE (SIZE (1..4)) OF
    BetaOffsets,
        semiStatic                 BetaOffsets
    }
    -- TAG-CONFIGUREDGRANTCONFIG-STOP
    -- ASN1STOP
```

| ConfiguredGrantConfig field descriptions |
|---|
| antennaPort |
| Indicates the antenna port(s) to be used for this configuration, and the maximum bitwidth is 5. See TS 38.214 [19], clause 6.1.2, and TS 38.212 [17], clause 7.3.1. |
| cg-DMRS-Configuration |
| DMRS configuration (see TS 38.214 [19], clause 6.1.2.3). |
| configuredGrantTimer |
| Indicates the initial value of the configured grant timer (see TS 38.321 [3]) in multiples of periodicity. |
| dmrs-SeqInitialization |
| The network configures this field if transform Precoder is disabled. Otherwise the field is absent. |
| frequencyDomainAllocation |
| Indicates the frequency domain resource allocation, see TS 38.214 [19], clause 6.1.2, and TS 38.212 [17], clause 7.3.1). |
| frequencyHopping |
| The value intraSlot enables 'Intra-slot frequency hopping' and the value interSlot enables 'Inter-slot frequency hopping'. If the field is absent, frequency hopping is not configured. |
| frequencyHoppingOffset |
| Frequency hopping offset used when frequency hopping is enabled (see TS 38.214 [19], clause 6.1.2 and clause 6.3). |
| mcs-Table |
| Indicates the MCS table the UE shall use for PUSCH without transform precoding. If the field is absent the UE applies the value qam64. |
| mcs-TableTransformPrecoder |
| Indicates the MCS table the UE shall use for PUSCH with transform precoding. If the field is absent the UE applies the value qam64. |
| mcsAndTBS |
| The modulation order, target code rate and TB size (see TS 38.214 [19], clause 6.1.2). The NW does not configure the values 28-31 in this version of the specification. |
| nrofHARQ-Processes |
| The number of HARQ processes configured. It applies for both Type 1 and Type 2. See TS 38.321 [3], clause 5.4.1. |
| p0-PUSCH-Alpha |
| Index of the P0-PUSCH-AlphaSet to be used for this configuration. |
| periodicity |
| Periodicity for UL transmission without UL grant for type 1 and type 2 (see TS 38.321 [3], clause 5.8.2). The following periodicities are supported depending on the configured subcarrier spacing [symbols]: 15 kHz: 2, 7, n*14, where n = {1, 2, 4, 5, 8, 10, 16, 20, 32, 40, 64, 80, 128, 160, 320, 640} 30 kHz: 2, 7, n*14, where n = {1, 2, 4, 5, 8, 10, 16, 20, 32, 40, 64, 80, 128, 160, 256, 320, 640, 1280} 60 kHz with normal CP 2, 7, n*14, where n = {1, 2, 4, 5, 8, 10, 16, 20, 32, 40, 64, 80, 128, 160, 256, 320, 512, 640, 1280, 2560} |

| ConfiguredGrantConfig field descriptions |
|---|
| 60 kHz with ECP: 2, 6, n*12, where n = {1, 2, 4, 5, 8, 10, 16, 20, 32, 40, 64, 80, 128, 160, 256, 320, 512, 640, 1280, 2560} 120 kHz: 2, 7, n*14, where n = {1, 2, 4, 5, 8, 10, 16, 20, 32, 40, 64, 80, 128, 160, 256, 320, 512, 640, 1024, 1280, 2560, 5120} |
| powerControlLoopToUse |
| Closed control loop to apply (see TS 38.213 [13], clause 7.1.1). |
| rbg-Size |
| Selection between configuration 1 and configuration 2 for RBG size for PUSCH. The UE does not apply this field if resourceAllocation is set to resourceAllocationType1. Otherwise, the UE applies the value config1 when the field is absent. Note: rbg-Size is used when the transformPrecoder parameter is disabled. |
| repK-RV |
| The redundancy version (RV) sequence to use. See TS 38.214 [19], clause 6.1.2. The network configures this field if repetitions are used, i.e., if repKis set to n2, n4 or n8. Otherwise, the field is absent. |
| repK |
| The number of repetitions of K. |
| resourceAllocation |
| Configuration of resource allocation type 0 and resource allocation type 1. For Type 1 UL data transmission without grant, resourceAllocation should be resourceAllocationType0 or resourceAllocationType1. |
| rrc-ConfiguredUplinkGrant |
| Configuration for "configured grant" transmission with fully RRC-configured UL grant (Type1). If this field is absent the UE uses UL grant configured by DCI addressed to CS-RNTI (Type2). Type 1 configured grant may be configured for UL or SUL, but not for both simultaneously. |
| srs-ResourceIndicator |
| Indicates the SRS resource to be used. |
| timeDomainAllocation |
| Indicates a combination of start symbol and length and PUSCH mapping type, see TS 38.214 [19], clause 6.1.2 and TS 38.212 [17], clause 7.3.1. |
| timeDomainOffset |
| Offset related to SFN = 0, see TS 38.321 [3], clause 5.8.2. |
| transformPrecoder |
| Enables or disables transform precoding for type1 and type2. If the field is absent, the UE enables or disables transform precoding in accordance with the field msg3-transformPrecoder in RACH-ConfigCommon, see TS 38.214 [19], clause 6.1.3. |
| uci-OnPUSCH |
| Selection between and configuration of dynamic and semi-static beta-offset. For Type 1 UL data transmission without grant, uci-OnPUSCH should be set to semiStatic. |

Configured Scheduling Radio Network Temporary Identifier (CS-RNTI) may be configured by RRC, such as discussed in 3GPP TS 38.300 V16.0.0. Parts of 3GPP TS 38.300 V16.0.0 are quoted below:

PhysicalCellGroupConfig
The IE PhysicalCellGroupConfig is used to configure cell-group specific L1 parameters.

```
-- ASN1START
-- TAG-PHYSICALCELLGROUPCONFIG-START
PhysicalCellGroupConfig ::=              SEQUENCE {
    harq-ACK-SpatialBundlingPUCCH            ENUMERATED {true}
OPTIONAL, -- Need S
    harq-ACK-SpatialBundlingPUSCH            ENUMERATED {true}
OPTIONAL, -- Need S
    p-NR-FR1                                 P-Max
OPTIONAL, -- Need R
    pdsch-HARQ-ACK-Codebook                  ENUMERATED {semiStatic,
dynamic},
    tpc-SRS-RNTI                             RNTI-Value
OPTIONAL, -- Need R
    tpc-PUCCH-RNTI                           RNTI-Value
OPTIONAL, -- Need R
    tpc-PUSCH-RNTI                           RNTI-Value
OPTIONAL, -- Need R
    sp-CSI-RNTI                              RNTI-Value
OPTIONAL, -- Need R
    cs-RNTI                                  SetupRelease { RNTI-Value }
OPTIONAL, -- Need M
    ...,
    [[
    mcs-C-RNTI                               RNTI-Value
OPTIONAL, -- Need R
    p-UE-FR1                                 P-Max
OPTIONAL -- Cond MCG-Only
    ]],
    [[
    xScale                                   ENUMERATED {dB0, dB6, spare2,
spare1}                          OPTIONAL -- Cond SCG-Only
    ]],
    [[
    pdcch-BlindDetection                     SetupRelease { PDCCH-
BlindDetection }                    OPTIONAL -- Need M
    ]]
}
PDCCH-BlindDetection :: =                INTEGER (1..15)
-- TAG-PHYSICALCELLGROUPCONFIG-STOP
-- ASN1STOP
```

PhysicalCellGroupConfig field descriptions cs-RNTI

RNTI value for downlink SPS (see SPS-Config) and uplink configured grant (see ConfiguredGrantConfig).

harq-ACK-SpatialBundlingPUCCH

Enables spatial bundling of HARQ ACKs. It is configured per cell group (i.e. for all the cells within the cell group) for PUCCH reporting of HARQ-ACK. It is only applicable when more than 4 layers are possible to schedule. When the field is absent, the spatial bundling is disabled (see TS 38.213 [13], clause 9.1.2.1).

harq-ACK-SpatialBundlingPUSCH

Enables spatial bundling of HARQ ACKs. It is configured per cell group (i.e. for all the cells within the cell group) for PUSCH reporting of HARQ-ACK. It is only applicable when more than 4 layers are possible to schedule. When the field is absent, the spatial bundling is disabled (see TS 38.213 [13], clauses 9.1.2.2 and 9.1.3.2).

mcs-C-RNTI

RNTI to indicate use of qam64LowSE for grant-based transmissions. When the mcs-C-RNTI is configured, RNTI scrambling of DCI CRC is used to choose the corresponding MCS table.

PhysicalCellGroupConfig field descriptions pdcch-BlindDetection

Indicates the reference number of cells for PDCCH blind detection for the CG. Network configures the field for each CG when the UE is in NR DC and sets the value in accordance with the constraints specified in TS 38.213 [13]. The network configures pdcch-BlindDetection only if the UE is in NR-DC.

p-NR-FR1

The maximum total transmit power to be used by the UE in this NR cell group across all serving cells in frequency range 1 (FR1). The maximum transmit power that the UE may use may be additionally limited by p-Max (configured in FrequencyInfoUL) and by p-UE-FR1 (configured total for all serving cells operating on FR1).

P-UE-FR1

The maximum total transmit power to be used by the UE across all serving cells in frequency range 1 (FR1) across all cell groups. The maximum transmit power that the UE may use may be additionally limited by p-Max (configured in FrequencyInfoUL) and by p-NR-FR1 (configured for the cell group).

pdsch-HARQ-ACK-Codebook

The PDSCH HARQ-ACK codebook is either semi-static or dynamic. This is applicable to both CA and none CA operation (see TS 38.213 [13], clauses 9.1.2 and 9.1.3).

-continued

PhysicalCellGroupConfig field descriptions sp-CSI-RNTI

RNTI for Semi-Persistent CSI reporting on PUSCH (see CSI-ReportConfig) (see TS 38.214 [19], clause 5.2.1.5.2). Network always configures the UE with a value for this field when at least one CSI-ReportConfig with reportConfigType set to semiPersistentOnPUSCH is configured.
tpc-PUCCH-RNTI RNTI used for PUCCH TPC commands on DCI (see TS 38.213 [13], clause 10.1).
tpc-PUSCH-RNTI RNTI used for PUSCH TPC commands on DCI (see TS 38.213 [13], clause 10.1).
tpc-SRS-RNTI RNTI used for SRS TPC commands on DCI (see TS 38.213 [13], clause 10.1).
xScale The UE is allowed to drop NR only if the power scaling applied to NR results in a difference between scaled and unsealed NR UL of more than xScale dB (see TS 38.213 [13]). If the value is not configured for dynamic power sharing, the UE assumes default value of 6 dB.

| Conditional Presence | Explanation |
|---|---|
| MCG-Only | This field is optionally present, Need R, in the PhysicalCellGroupConfig of the MCG. It is absent otherwise. |
| SCG-Only | This field is optionally present, Need S, in the PhysicalCellGroupConfig of the SCG in (NG)EN-DC as defined in TS 38.213 [13]. It is absent otherwise. |

In NR Medium Access Control (MAC) specification, handling of transmission related to CS-RNTI is discussed in 3GPP TS 38.321 V15.8.0, and a configured grant timer may be started, restarted, and/or stopped based on one or more of the conditions discussed 3GPP TS 38.321 V15.8.0. Parts of 3GPP TS 38.321 V15.8.0 are quoted below:

5.4.1 UL Grant Reception

Uplink grant is either received dynamically on the PDCCH, in a Random Access Response, or configured semi-persistently by RRC. The MAC entity shall have an uplink grant to transmit on the UL-SCH. To perform the requested transmissions, the MAC layer receives HARQ information from lower layers.

If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:

1> if an uplink grant for this Serving Cell has been received on the PDCCH for the MAC entity's C-RNTI or Temporary C-RNTI; or
1> if an uplink grant has been received in a Random Access Response:
  2> if the uplink grant is for MAC entity's C-RNTI, and the previous uplink grant delivered to the HARQ entity for the same HARQ process was either an uplink grant received for the MAC entity's CS-RNTI or a configured uplink grant:
    3> consider the NDI to have been toggled for the corresponding HARQ process regardless of the value of the NDI.
  2> if the uplink grant is for MAC entity's C-RNTI, and the identified HARQ process is configured for a configured uplink grant:
    3> start or restart the configuredGrantTimer for the correponding HARQ process, if configured.
  2> deliver the uplink grant and the associated HARQ information to the HARQ entity.
1> else if an uplink grant for this PDCCH occasion has been received for this Serving Cell on the PDCCH for the MAC entity's CS-RNTI:
  2> if the NDI in the received HARQ information is 1:
    3> consider the NDI for the corresponding HARQ process not to have been toggled;
    3> start or restart the configuredGrantTimer for the corresponding HARQ process, if configured;
    3> deliver the uplink grant and the associated HARQ information to the HARQ entity.
  2> else if the NDI in the received HARQ information is 0:
    3> if PDCCH contents indicate configured grant Type 2 deactivation:
      4> trigger configured uplink grant confirmation.
    3> else if PDCCH contents indicate configured grant Type 2 activation:
      4> trigger configured uplink grant confirmation;
      4> store the uplink grant for this Serving Cell and the associated HARQ information as configured uplink grant;
      4> initialise or re-initialise the configured uplink grant for this Serving Cell to start in the associated PUSCH duration and to recur according to rules in clause 5.8.2;
      4> stop the configuredGrantTimer for the corresponding HARQ process, if running;

For each Serving Cell and each configured uplink grant, if configured and activated, the MAC entity shall:
1> if the PUSCH duration of the configured uplink grant does not overlap with the PUSCH duration of an uplink grant received on the PDCCH or in a Random Access Response for this Serving Cell:
  2> set the HARQ Process ID to the HARQ Process ID associated with this PUSCH duration;
  2> if the configuredGrantTimer for the corresponding HARQ process is not running:
    3> consider the NDI bit for the corresponding HARQ process to have been toggled;
    3> deliver the configured uplink grant and the associated HARQ information to the HARQ entity.

5.4.2.1 HARQ Entity

...

For each uplink grant, the HARQ entity shall:
1> identify the HARQ process associated with this grant, and for each identified HARQ process:
  2> if the received grant was not addressed to a Temporary C-RNTI on PDCCH, and the NDI provided in the associated HARQ information has been toggled compared to the value in the previous transmission of this TB of this HARQ process; or
  2> if the uplink grant was received on PDCCH for the C-RNTI and the HARQ buffer of the identified process is empty; or
  2> if the uplink grant was received in a Random Access Response; or
  2> if the uplink grant was received on PDCCH for the C-RNTI in ra-ResponseWindow and this PDCCH successfully completed the Random Access procedure initiated for beam failure recovery; or
  2> if the uplink grant is part of a bundle of the configured uplink grant, and may be used for initial transmission according to clause 6.1.2.3 of TS 38.214 [7], and if no MAC PDU has been obtained for this bundle:
    3> if there is a MAC PDU in the Msg3 buffer and the uplink grant was received in a Random Access Response; or:
    3> if there is a MAC PDU in the Msg3 buffer and the uplink grant was received on PDCCH for the C-RNTI in ra-ResponseWindow and this PDCCH successfully completed the Random Access procedure initiated for beam failure recovery:
      4> obtain the MAC PDU to transmit from the Msg3 buffer.
      4> if the uplink grant size does not match with size of the obtained MAC PDU; and
      4> if the Random Access procedure was successfully completed upon receiving the uplink grant:

-continued

```
        5> indicate to the Multiplexing and assembly entity to include
           MAC subPDU(s) carrying MAC SDU from the obtained
           MAC PDU in the subsequent uplink transmission;
        5> obtain the MAC PDU to transmit from the Multiplexing
           and assembly entity.
     3> else:
        4> obtain the MAC PDU to transmit from the Multiplexing and
           assembly entity, if any;
     3> if a MAC PDU to transmit has been obtained:
        4> deliver the MAC PDU and the uplink grant and the HARQ
           information of the TB to the identified HARQ process;
        4> instruct the identified HARQ process to trigger a new
           transmission;
        4> if the uplink grant is addressed to CS-RNTI; or
        4> if the uplink grant is a configured uplink grant; or
        4> if the uplink grant is addressed to C-RNTI, and the identified
           HARQ process is configured for a configured uplink grant:
           5> start or restart the configuredGrantTimer, if configured,
              for the corresponding HARQ process when the transmission
              is performed.
     3> else:
        4> flush the HARQ buffer of the identified HARQ process.
  2> else (i.e. retransmission):
     3> if the uplink grant received on PDCCH was addressed to CS-
        RNTI and if the HARQ buffer of the identified process is empty;
        or
     3> if the uplink grant is part of a bundle and if no MAC PDU has
        been obtained for this bundle; or
     3> if the uplink grant is part of a bundle of the configured uplink
        grant, and the PUSCH duration of the uplink grant overlaps with
        a PUSCH duration of another uplink grant received on the
        PDCCH or in a Random Access Response for this Serving Cell:
        4> ignore the uplink grant.
     3> else:
        4> deliver the uplink grant and the HARQ information
           (redundancy version) of the TB to the identified HARQ
           process;
        4> instruct the identified HARQ process to trigger a
           retransmission;
        4> if the uplink grant is addressed to CS-RNTI; or
        4> if the uplink grant is addressed to C-RNTI, and the
           identified HARQ process is configured for a configured
           uplink grant:
           5> start or restart the configuredGrantTimer, if configured,
              for the corresponding HARQ process when the
              transmission is performed.
```

When determining if NDI has been toggled compared to the value in the previous transmission the MAC entity shall ignore NDI received in all uplink grants on PDCCH for its Temporary C-RNTI.

5.4.2.2 HARQ Process

Each HARQ process is associated with a HARQ buffer.

New transmissions are performed on the resource and with the MCS indicated on either PDCCH, Random Access Response, or RRC. Retransmissions are performed on the resource and, if provided, with the MCS indicated on PDCCH, or on the same resource and with the same MCS as was used for last made transmission attempt within a bundle.

If the HARQ entity requests a new transmission for a TB, the HARQ process shall:

1> store the MAC PDU in the associated HARQ buffer;

1> store the uplink grant received from the HARQ entity;

1> generate a transmission as described below.

If the HARQ entity requests a retransmission for a TB, the HARQ process shall:

1> store the uplink grant received from the HARQ entity;

1> generate a transmission as described below.

To generate a transmission for a TB, the HARQ process shall:

1> if the MAC PDU was obtained from the Msg3 buffer; or

1> if there is no measurement gap at the time of the transmission and, in case of retransmission, the retransmission does not collide with a transmission for a MAC PDU obtained from the Msg3 buffer:

2> instruct the physical layer to generate a transmission according to the stored uplink grant.

Radio Network Temporary Identifier (RNTI) usage in NR is discussed in 3GPP TS 38.321 V15.8.0. A table from 3GPP TS 38.321 V15.8.0 is quoted below:

TABLE 7

1-2: RNTI usage.

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |
| RA-RNTI | Random Access Response | DL-SCH | N/A |
| Temporary C-RNTI | Contention Resolution (when no valid C-RNTI is available) | DL-SCH | CCCH, DCCH |
| Temporary C-RNTI | Msg3 transmission | UL-SCH | CCCH, DCCH, DTCH |
| C-RNTI, MCS-C-RNTI | Dynamically scheduled unicast transmission | UL-SCH | DCCH, DTCH |
| C-RNTI | Dynamically scheduled unicast transmission | DL-SCH | CCCH, DCCH, DTCH |
| MCS-C-RNTI | Dynamically scheduled unicast transmission | DL-SCH | DCCH, DTCH |
| C-RNTI | Triggering of PDCCH ordered random access | N/A | N/A |
| CS-RNTI | Configured scheduled unicast transmission (activation, reactivation and retransmission) | DL-SCH, UL-SCH | DCCH, DTCH |
| CS-RNTI | Configured scheduled unicast transmission (deactivation) | N/A | N/A |
| TPC-PUCCH-RNTI | PUCCH power control | N/A | N/A |
| TPC-PUSCH-RNTI | PUSCH power control | N/A | N/A |
| TPC-SRS-RNTI | SRS trigger and power control | N/A | N/A |
| INT-RNTI | Indication pre-emption in DL | N/A | N/A |
| SFI-RNTI | Slot Format Indication on the given cell | N/A | N/A |
| SP-CSI-RNTI | Activation of Semi-persistent CSI reporting on PUSCH | N/A | N/A |

NOTE: The usage of MCS-C-RNTI is equivalent to that of C-RNTI in MAC procedures (except for the C-RNTI MAC CE).

A pre-configured Physical Uplink Shared Channel (PUSCH) resource may be used for enabling small data transmission in inactive state (e.g., at least one of Radio Resource Control (RRC) inactive state, RRC_INACTIVE state, inactive mode, etc.). The pre-configured PUSCH resource may be similar to configured grant type 1 (CG type 1), such as specified in 3GPP TS 38.331 V15.8.0 (where ConfiguredGrantConfig information element (IE) is discussed). For example, one or more characteristics and/or functionalities of the pre-configured PUSCH resource may be the same as and/or similar to one or more characteristics and/or functionalities of a CG type 1. According to 3GPP RP-193252, a configuration of one or more CG type 1 resources for small data transmission in uplink (UL) for inactive state may be considered.

For CG type 1, a configured uplink grant may be provided by RRC (e.g., rrc-ConfiguredUplinkG rant in ConfiguredGrantConfig, such as discussed in 3GPP TS 38.331 V15.8.0). Different from CG type 1, for configured grant type 2 (CG type 2), a periodicity of a configured uplink grant may be provided via RRC and a configured uplink grant for CG type 2 may be provided via Physical Downlink Control Channel (PDCCH). A UE may maintain a Configured Scheduling Radio Network Temporary Identifier (CS-RNTI) configured by a network. A PDCCH addressed to the CS-RNTI may be used to indicate activation and/or deactivation of a CG Type 2 (e.g., the activation and/or deactivation may not be applied to CG type 1) and/or may be used to indicate retransmission of a configured grant transmission (e.g., the indication of retransmission of the configured grant transmission may be applied for CG type 1 and CG type 2). According to the NR Medium Access Control (MAC) specification of 3GPP TS 38.321 V15.8.0, for an uplink transmission using a configured grant, the uplink grant for its retransmission is transmitted on PDCCH addressed to CS-RNTI of the UE, where a New Data Indicator (NDI) in the PDCCH is set to (and/or indicative of and/or equal to) 1. If the NDI in the PDCCH is set to (and/or indicative of and/or equal to) 0, the NDI, the PDCCH and/or the uplink grant may be used for CG type 2 activation and/or deactivation.

If a configured grant (e.g., CG type 1) is applicable in RRC_INACTIVE state (and/or inactive state), a UE may (be required to and/or need to, for example) maintain and/or monitor Radio Network Temporary Identifier (RNTI) (e.g., CS-RNTI and/or a different (and/or new) RNTI having one or more characteristics, functions and/or usages similar to and/or the same as one or more characteristics, functions and/or usages of CS-RNTI) in RRC_INACTIVE state. The RNTI used in RRC_INACTIVE state (e.g., the RNTI may be called inactive RNTI (IN-RNTI)) may be used to indicate retransmission of a configured grant transmission (e.g., the RNTI used in RRC_INACTIVE state may have a usage and/or functionality in RRC_INACTIVE state that is similar to usage and/or functionality of CS-RNTI in RRC_connected state). In some examples, if CG type 1 is applicable in RRC_INACTIVE state (instead of CG type 2, for example), configured grant activation and/or deactivation via PDCCH may not be needed and/or used. Alternatively and/or additionally, if CG type 2 is applicable in RRC_INACTIVE state (instead of CG type 1, for example), configured grant activation and/or deactivation via PDCCH may be needed and/or used for activating and/or deactivating a configured grant (e.g., CG type 2).

On the other hand, although small data transmission may be performed via CG type 1 in RRC_INACTIVE state and IN-RNTI (e.g., CS-RNTI and/or other type of RNTI) may be used for retransmission, subsequent uplink transmissions in RRC_INACTIVE state may also be supported. A subsequent uplink transmission may correspond to an uplink transmission that is after a first uplink transmission, in RRC_INACTIVE state, using a configured grant (e.g., CG type 1). For example, the first uplink transmission may be an initial uplink transmission performed in RRC_INACTIVE state. In an example, the first uplink transmission using the configured grant may not be able to accommodate uplink data available for transmission, and the UE may need to monitor PDCCH for a dynamic uplink grant allocation for one or more subsequent uplink transmissions. In this situation, one or more rules (e.g., one or more principles) of interpreting downlink control information (DCI) (e.g., NDI) on PDCCH addressed to CS-RNTI in RRC_connected may not serve the purpose of dynamic uplink grant allocation for one or more subsequent uplink transmissions and/or a UE may not be able to determine whether an uplink grant is for a new transmission (e.g., a new dynamically scheduled transmission) or a retransmission (e.g., a retransmission of a transmission scheduled by a configured grant, such as the first uplink transmission), such as because CS-RNTI may not indicate a dynamic uplink grant for a new transmission. An example of the issue is shown in FIG. 5.

Figure 5:
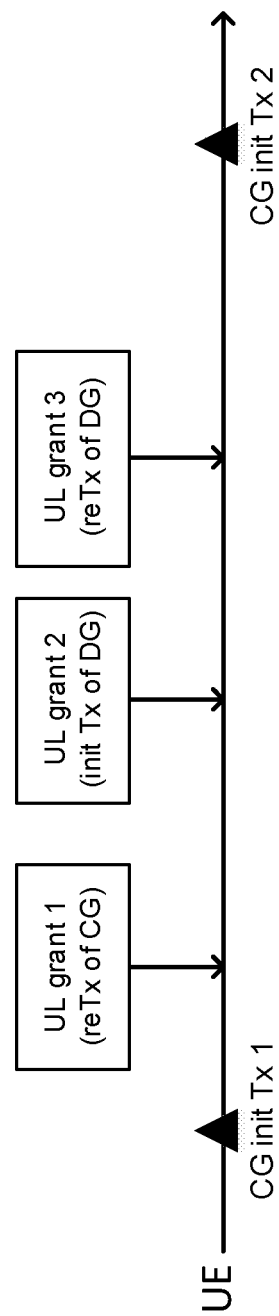
FIG. 5 is a diagram illustrating an exemplary scenario in which a UE receives uplink grants.

FIG. 5 illustrates an example in which a UE (a timeline of which is labeled "UE" in FIG. 5) receives uplink grants comprising UL grant 1, UL grant 2 and/or UL grant 3. In some examples, the UE may perform one or more configured scheduled transmissions, such as one or more new (e.g., initial) configured scheduled transmissions comprising a first configured scheduled transmission (labeled "CG init Tx 1" in FIGS. 5, 7, 11-13) and/or a second configured scheduled transmission (labeled "CG init Tx 2" in FIGS. 5, 7, 11-13). A configured scheduled transmission (e.g., a new configured scheduled transmission) may correspond to a transmission (e.g., a new transmission) scheduled by a configured grant. In the example, the UL grant 1 may be for performance of a retransmission (labeled "reTx of CG" in FIGS. 5, 7, 11-13). For example, the UL grant 1 may indicate one or more resources that are for the retransmission (e.g., the retransmission may be performed using the one or more resources). The retransmission associated with the UL grant 1 may correspond to a retransmission of a configured scheduled transmission (e.g., the first configured scheduled transmission). In the example, the UL grant 2 may be for performance of a new (e.g., initial) transmission (labeled "init Tx of DG" in FIGS. 5, 7, 11-13). For example, the UL grant 2 may indicate one or more resources that are for the new transmission (e.g., the new transmission may be performed using the one or more resources). The new transmission associated with the UL grant 2 may correspond to a new dynamically scheduled transmission (e.g., a new transmission scheduled by a dynamic grant). In the example, the UL grant 3 may be for performance of a retransmission (labeled "reTx of DG" in FIGS. 5, 7, 11-13). For example, the UL grant 3 may indicate one or more resources that are for the retransmission (e.g., the retransmission may be performed using the one or more resources). The retransmission associated with the UL grant 3 may correspond to a retransmission of a dynamically scheduled transmission (e.g., such as the new dynamically scheduled transmission associated with the UL grant 2). The UE may not be able to differentiate between the uplink grants. When the UE receives an uplink grant on PDCCH after a transmission using a configured grant, the UE may not be able to (and/or it may be difficult for the UE to) determine whether the uplink grant is for a retransmission, a new transmission, or other transmission.

Thus, in accordance with the present disclosure, one or more of techniques and/or methods are provided herein to enable a UE (e.g., a UE in inactive state) to determine whether an uplink grant is for a new transmission or for a retransmission and/or to enable the UE to perform small data transmission and/or subsequent data transmission when the UE is in inactive state (e.g., the subsequent data transmission may comprise one or more new transmissions after an initial new transmission in inactive state). In some examples, in response to reception of an uplink grant from a network node, a UE in inactive state determines whether the uplink grant is for a new transmission (e.g., a dynamically scheduled transmission) or a retransmission (e.g., a retransmission of a configured scheduled transmission) based on a DCI which schedules the uplink grant. The new transmission may correspond to a transmission of a first Medium Access Control Protocol Data Unit (MAC PDU). The retransmission may correspond to a retransmission of a second MAC PDU different than the first MAC PDU. For example, the determination of whether the uplink grant is for the new transmission or the retransmission may be based on a field (e.g., NDI) in the DCI. Alternatively and/or additionally, the determination of whether the uplink grant is for the new transmission or the retransmission may be based on a Hybrid Automatic Repeat Request (HARQ) process indicated by the DCI. Alternatively and/or additionally, the determination of whether the uplink grant is for the new transmission or the retransmission may be based on a RNTI to which a PDCCH carrying the DCI is addressed.

The new transmission may correspond to a dynamically scheduled transmission. The retransmission may correspond to a retransmission of a configured scheduled transmission. The UE may perform the configured scheduled transmission before receiving the uplink grant. Alternatively and/or additionally, the retransmission may be a retransmission of a dynamically scheduled transmission.

If the UE determines that the uplink grant is for a new transmission (of a first MAC PDU, for example), the UE may use the uplink grant to perform a new transmission (of the first MAC PDU, for example). If the UE determines that the uplink grant is for a retransmission (of a second MAC PDU different than the first MAC PDU, for example), the UE may use the uplink grant to perform a retransmission (of the second MAC PDU, for example).

The UE may maintain a first RNTI in inactive state. The first RNTI may be configured by a network when the UE is in connected mode (e.g., at least one of connected state, RRC_connected state, RRC_connected mode, RRC_CONNECTED state, RRC_CONNECTED mode, RRC_connected, etc.). The first RNTI may be inherited from a RNTI (e.g., a CS-RNTI) used in connected mode. For example, the UE may use the first RNTI (e.g., a CS-RNTI) in connected mode and the UE may reuse the first RNTI in inactive state. The first RNTI may be set by the UE (without receiving a configuration of the first RNTI, for example) upon and/or in response to entering inactive state. The first RNTI may be a CS-RNTI. Alternatively and/or additionally, the first RNTI may be an IN-RNTI. The first RNTI may be specific to inactive state and/or the first RNTI may not be applicable in connected mode (e.g., the UE may not use the first RNTI when the UE is in connected mode).

In some examples, such as where the first RNTI is a CS-RNTI, the first RNTI may be configured by a network via a RRC message (e.g., at least one of a RRC setup message, a RRC resume message, a RRC reconfiguration message, a RRC release message, etc.). The UE may monitor the first RNTI when the UE is in connected mode. When the UE is in inactive state, the UE reuses (and/or keeps using) the first RNTI and/or monitors the first RNTI (e.g., monitors the first RNTI for potential uplink grant allocation) in inactive state. The network may not need to configure (and/or reconfigure) the first RNTI for the UE before the UE enters inactive state (and/or the network may not configure (and/or reconfigure) the first RNTI for the UE before the UE enters inactive state), such as due to the UE reusing the first RNTI when the UE is in inactive state.

In some examples, such as where the first RNTI is an IN-RNTI, in response to entering inactive state from connected mode, the UE sets the first RNTI to a value of a second RNTI (e.g., a CS-RNTI) that is used (by the UE) in connected mode. The UE may not monitor the first RNTI in connected mode. The UE may monitor the first RNTI (e.g., monitor the first RNTI for potential uplink grant allocation) in inactive state. The network may not need to configure (and/or reconfigure) the first RNTI for the UE before the UE enters inactive state (and/or the network may not configure (and/or reconfigure) the first RNTI for the UE before the UE enters inactive state), such as due to the UE setting the first RNTI to a value of the second RNTI in response to entering inactive state.

In some examples, a UE may reuse a configured grant configuration in connected mode as a configured grant configuration to be used in inactive state. A network may indicate to a UE (by providing an indication to the UE, for example) whether a configured grant (e.g., CG type 1, CG type 2) configuration that the UE uses in connected mode (or called connected mode configured grant (e.g., CG type 1, CG type 2) configuration) is to be reused (and/or can be reused) as a configured grant (e.g., CG type 1) configuration to be used in inactive state (or called inactive state configured grant (e.g., CG type 1) configuration). If the network indicates that the connected mode configured grant (e.g., CG type 1, CG type 2) configuration can be reused in inactive state, the UE may reuse the connected mode configured grant (e.g., CG type 1, CG type 2) configuration as an inactive state configured grant (e.g., CG type 1) configuration of the UE. For example, the UE may use the connected mode configured grant (e.g., CG type 1, CG type 2) configuration (as the inactive state configured grant (e.g., CG type 1) configuration) after the UE enters inactive state, when the UE is in inactive state, and/or when Timing Advance and/or Timing Alignment (TA) is valid.

In some examples, if the network indicates that a connected mode configured grant (e.g., CG type 1, CG type 2) configuration is not to be reused (and/or cannot be reused) in inactive state, the UE may not reuse the connected mode configured grant (e.g., CG type 1, CG type 2) configuration as an inactive state configured grant (e.g., CG type 1) configuration of the UE. For example, the UE may not use the connected mode configured grant (e.g., CG type 1, CG type 2) configuration after the UE enters inactive state, when the UE is in inactive state, and/or when Timing Advance and/or Timing Alignment (TA) is valid. In some examples, if the network indicates that a connected mode configured grant (e.g., CG type 1, CG type 2) configuration is not to be reused (and/or cannot be reused) in inactive state, the UE may store the connected mode configured grant (e.g., CG type 1, CG type 2) configuration upon (and/or in response to and/or prior to) the UE entering inactive state. The connected mode configured grant (e.g., CG type 1, CG type 2) configuration may be resumed upon (and/or in response to) the UE entering connected mode from inactive state. For example, the UE may start using and/or applying the connected mode configured grant (e.g., CG type 1, CG type 2) configuration upon (and/or in response to) the UE entering connected mode from inactive state. In some examples, if the network indicates that a connected mode configured grant (e.g., CG type 1, CG type 2) configuration is not to be reused (and/or cannot be reused) in inactive state, the UE may release the connected mode configured grant (e.g., CG type 1, CG type 2) configuration upon (and/or in response to) the UE entering inactive state.

The network may indicate to the UE whether a connected mode configured grant (e.g., CG type 1, CG type 2) configuration is to be reused in inactive state via an explicit indication. For example, an indication (e.g., the explicit indication) may be included in a signaling message transmitted from the network to the UE. In response to receiving the indication, the UE may determine (based on the indication, for example) whether to reuse a connected mode configured grant (e.g., CG type 1, CG type 2) configuration for inactive state (e.g., as an inactive state CG type 1 configuration of the UE).

Alternatively and/or additionally, the network may indicate to the UE whether a connected mode configured grant (e.g., CG type 1, CG type 2) configuration is to be reused in inactive state via an implicit indication. For example, if a connected mode configured grant (e.g., CG type 1, CG type 2) configuration is not released by the network, the UE may reuse the connected mode configured grant (e.g., CG type 1, CG type 2) configuration for inactive state. Alternatively and/or additionally, if a connected mode configured grant (e.g., CG type 1, CG type 2) configuration is not reconfigured by the network (prior to the UE entering inactive state, for example), the UE may reuse the configured grant (e.g., CG type 1, CG type 2) configuration in inactive state Alternatively and/or additionally, if an inactive state configured grant (e.g., CG type 1) configuration is not configured by the network, the UE may reuse the connected mode configured grant (e.g., CG type 1, CG type 2) configuration (if the UE is configured with the connected mode configured grant (e.g., CG type 1, CG type 2) configuration and/or if the UE is configured with any connected mode configured grant (e.g., CG type 1, CG type 2) configuration).

An indication (e.g., the explicit indication or the implicit indication) may be included in a message (e.g., a message transmitted to the UE), such as a message indicative of releasing a RRC connection (e.g., RRC release message), a message indicative of suspending a RRC connection (e.g., RRC release message with suspendConfig) and/or a RRC reconfiguration message.

The configured grant (e.g., CG type 1, CG type 2) configuration may be associated with (e.g., specific to and/or indicative of) a bandwidth part (BWP). The network may indicate, to the UE, a BWP of the connected mode configured grant (e.g., CG type 1, CG type 2) configuration to be reused. For example, the network may transmit an indication, indicative of the BWP, to the UE. The UE may identify the connected mode configured grant (e.g., CG type 1, CG type 2) configuration to be reused in inactive state based upon a determination that the connected mode configured grant (e.g., CG type 1, CG type 2) configuration is associated with the BWP. Alternatively and/or additionally, the network may indicate, to the UE, a BWP, wherein the UE may reuse a configuration (e.g., the connected mode configured grant (e.g., CG type 1, CG type 2) configuration) as an inactive state configured grant (e.g., CG type 1) configuration of the BWP.

In some examples, a UE may be configured with a configured grant configuration to be used in inactive state by reconfiguring a configured grant configuration that is used in connected mode (e.g., a connected mode configured grant configuration). For example, a network may reconfigure a connected mode configured grant (e.g., CG type 1) configuration of a UE to a configured grant (e.g., CG type 1) configuration for the UE to use in inactive state. For example, a UE may receive a signaling to reconfigure a connected mode configured grant (e.g., CG type 1) configuration to an inactive state configured grant (e.g., CG type 1) configuration (to be used by the UE in inactive state, for example). A configured grant (e.g., CG type 1) configuration (e.g., an inactive state configured grant (e.g., CG type 1) configuration to be used in inactive state) may be included in the signaling. The configured grant (e.g., CG type 1) configuration may be a delta configuration (e.g., a delta configuration with respect to a current configured grant (e.g., CG type 1) configuration of the UE, such as a configured grant (e.g., CG type 1) configuration that the UE currently uses and/or with which the UE is configured when the UE receives the signaling). The UE may be configured with a configured grant (e.g., CG type 1) configuration (e.g., connected mode configured grant (e.g., CG type 1) configuration) when the UE receives the signaling.

A delta configuration may be indicative of and/or may correspond to a difference between a current configuration (e.g., a configured grant configuration that the UE currently uses and/or with which the UE is currently configured) and a configuration (e.g., reconfiguration) with which the UE is to be configured based upon the delta configuration. For example, the UE may determine and/or be configured with the configuration (e.g., the reconfiguration) using and/or based on the delta configuration and the current configuration. Alternatively and/or additionally, the current configuration may be reconfigured to the configuration (e.g., the reconfiguration) using and/or in accordance with the delta configuration. For example, the configuration (e.g., the reconfiguration) may be configured by modifying the current configuration based upon the delta configuration. The delta configuration and/or the difference indicated by the delta configuration may be in addition to the current configuration (e.g., the delta configuration and/or the difference indicated by the delta configuration may be added to and/or combined with the current configuration to configure the configuration (e.g., the reconfiguration)).

The signaling may be used to trigger the UE to enter inactive state from connected mode (e.g., change from connected mode to inactive state). The signaling may be RRC release message (e.g., with suspendConfig). In some examples, if the signaling comprises a configuration of configured grant (e.g., CG type 1), the UE applies the configuration and enters inactive state in response to receiving the signaling.

If the UE is configured with a first configured grant (e.g., CG type 1) configuration (e.g., a connected mode configured grant (e.g., CG type 1) configuration) and receives a signaling to trigger the UE to enter inactive state from connected mode, wherein the signaling does not comprise a configured grant (e.g., CG type 1) configuration, the UE may release the first configured grant (e.g., CG type 1) configuration and enter inactive state in response to receiving the signaling. The first configured grant (e.g., CG type 1) configuration may not be used if (and/or when) the UE is in inactive state (and/or when Timing Advance and/or Timing Alignment (TA) is not valid).

If the UE is configured with a first configured grant (e.g., CG type 1) configuration (e.g., a connected mode configured grant (e.g., CG type 1) configuration) and receives a signaling to trigger the UE to enter inactive state from connected mode, wherein the signaling does not comprise a configured grant (e.g., CG type 1) configuration, the UE may continue using the first configured grant (e.g., CG type 1) configuration and enter inactive state in response to receiving the signaling. The configured grant (e.g., CG type 1) configuration may be used when the UE is in inactive state (and/or when Timing Advance and/or Timing Alignment (TA) is valid).

When the UE enters inactive state from connected mode, the UE may store a configured grant (e.g., CG type 1) configuration. The stored configured grant (e.g., CG type 1) configuration stored by the UE may be a configuration that is used by the UE before a reconfiguration, e.g., before the network reconfigures a connected mode configured grant (e.g., CG type 1) configuration (e.g., the stored configured grant (e.g., CG type 1) configuration) to an inactive state configured grant (e.g., CG type 1) configuration. Alternatively and/or additionally, the stored configured grant (e.g., CG type 1) configuration may be a configuration that is used by the UE after the reconfiguration e.g., after the network reconfigures a connected mode configured grant (e.g., CG type 1) configuration to an inactive state configured grant (e.g., CG type 1) configuration. Alternatively, when the UE enters inactive state from connected mode, the UE may release a connected mode configured grant (e.g., CG type 1) configuration (used in connected mode prior to entering inactive state, for example). The connected mode configured grant (e.g., CG type 1) configuration may be released if the connected mode configured grant (e.g., CG type 1) configuration is reconfigured to an inactive state configured grant (e.g., CG type 1) configuration.

The signaling may be a reconfiguration message (e.g., RRC reconfiguration message) that does not trigger the UE to enter inactive state. The network may indicate that a configured grant (e.g., CG type 1) configuration is for inactive state. If the UE receives the signaling including a configured grant (e.g., CG type 1) configuration, the UE may determine whether the configured grant (e.g., CG type 1) configuration is for use in connected mode or inactive state. If the configured grant (e.g., CG type 1) configuration is to be used for connected mode, the UE may apply the configured grant (e.g., CG type 1) configuration. If the configured grant (e.g., CG type 1) configuration is to be used for inactive state, the UE may store the configuration and apply the configured grant (e.g., CG type 1) configuration when the UE enters inactive state (and/or in response to the UE entering inactive state).

The configured grant (e.g., CG type 1) configuration may be associated with (e.g., specific to and/or indicative of) a BWP. The network may indicate, to the UE, a BWP of the connected mode configured grant (e.g., CG type 1) configuration to be reconfigured. For example, the network may transmit an indication, indicative of the BWP, to the UE. The UE may identify the connected mode configured grant (e.g., CG type 1) configuration to be reconfigured to an inactive state configured grant (e.g., CG type 1) configuration based upon a determination that the connected mode configured grant (e.g., CG type 1) configuration is associated with the BWP. Alternatively and/or additionally, the network may indicate, to the UE, a BWP, wherein the UE may reconfigure a configuration (e.g., the connected mode configured grant (e.g., CG type 1, CG type 2) configuration) to an inactive state configured grant (e.g., CG type 1) configuration of the BWP.

In some examples, an indication in the uplink grant is used (by the UE, for example) to determine whether the uplink grant is for a new transmission (of a first MAC PDU, for example) or a retransmission (of a second MAC PDU different than the first MAC PDU, for example). The indication may be a new data indicator (NDI). The indication may be a field (e.g., NDI) included in downlink control information (DCI) of the uplink grant. The indication may be included in HARQ information of the uplink grant. The indication may be signaled via PDCCH (e.g., a signal transmitted via PDCCH may carry the indication).

For example, the indication being set to (and/or indicative of and/or equal to) a first value (e.g., 1) indicates that the uplink grant is for a new transmission (of a first MAC PDU, for example). In an example, the UE may determine that the uplink grant is for a new transmission (of the first MAC PDU, for example) based on a determination that the indication is set to (and/or indicative of and/or equal to) the first value. Alternatively and/or additionally, the indication being set to (and/or indicative of and/or equal to) a second value (e.g., 0) indicates that the uplink grant is for a retransmission (of a second MAC PDU different than the first MAC PDU, for example). In an example, the UE may determine that the uplink grant is for a retransmission (of the second MAC PDU, for example) based on a determination that the indication is set to (and/or indicative of and/or equal to) the second value. Examples are illustrated in FIGS. 6-7.

Figure 6:
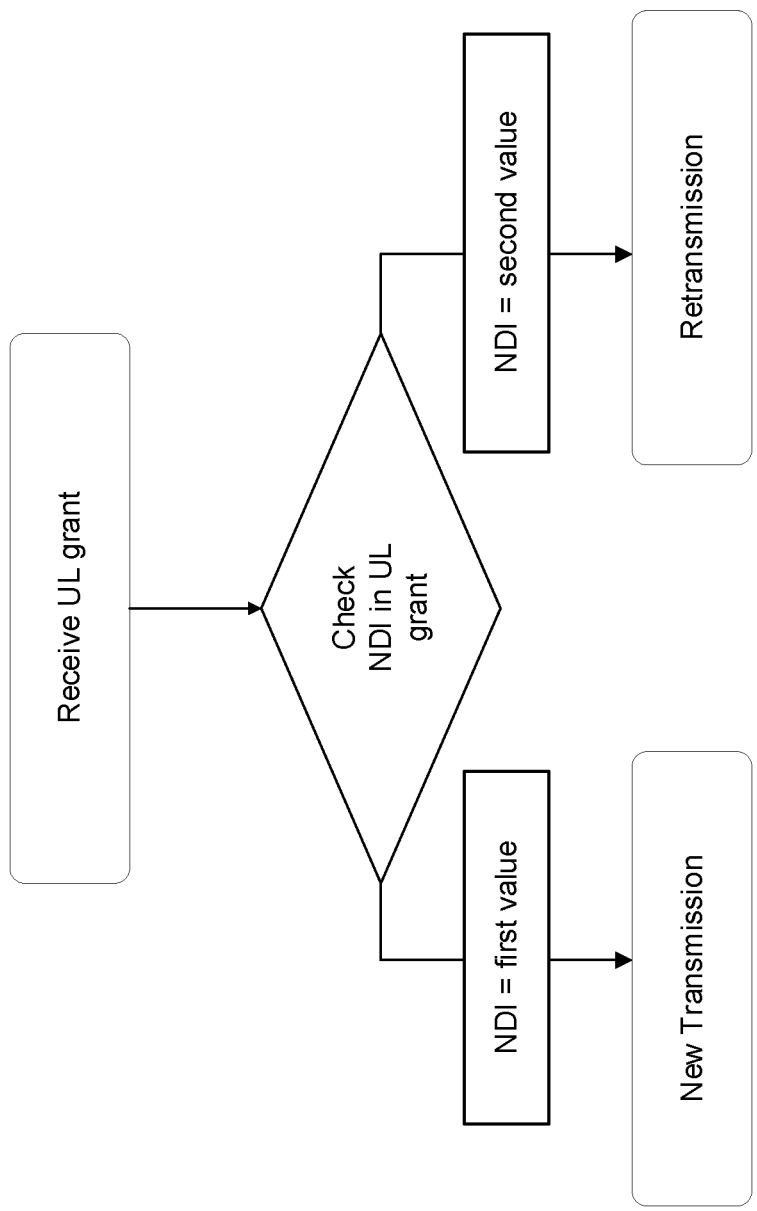
FIG. 6 is a diagram illustrating an exemplary scenario in which a UE receives an uplink grant, according to one exemplary embodiment.

FIG. 6 illustrates an example in which the UE receives an uplink grant (such as when the UE is in inactive state). The UE checks a NDI in the uplink grant to determine whether the uplink grant is for a new transmission or a retransmission. The UE determines that the uplink grant is for a new transmission based on the NDI being set to (and/or indicative of and/or equal to) to the first value. Alternatively and/or additionally, the UE determines that the uplink grant is for a retransmission based on the NDI being set to (and/or indicative of and/or equal to) the second value.

Figure 7:
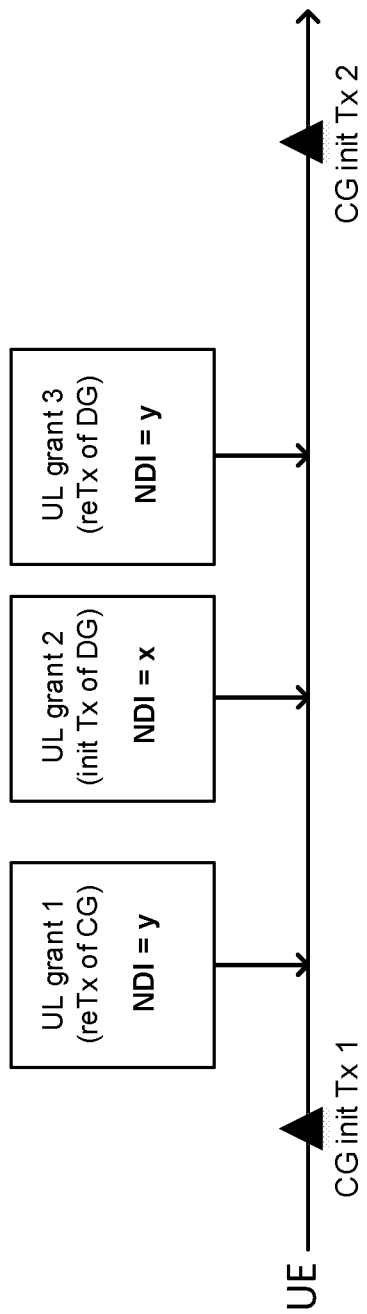
FIG. 7 is a diagram illustrating an exemplary scenario in which a UE receives uplink grants, according to one exemplary embodiment.

FIG. 7 illustrates an example in which the UE (a timeline of which is labeled "UE" in FIG. 7) receives uplink grants comprising UL grant 1, UL grant 2 and/or UL grant 3 (such as when the UE is in inactive state). In the example, the first value (indicating a new transmission, for example) may be x and/or the second value (indicating a retransmission, for example) may be y. The UE may determine that the UL grant 1 is for a retransmission (e.g., a retransmission of a configured scheduled transmission, such as a transmission scheduled by a configured grant) based on a NDI of the UL grant 1 being set to (and/or indicative of and/or equal to) y (e.g., the second value associated with retransmission). The UE may determine that the UL grant 2 is for a new transmission (e.g., a dynamically scheduled transmission) based on a NDI of the UL grant 2 being set to (and/or indicative of and/or equal to) x (e.g., the first value associated with new transmission). The UE may determine that the UL grant 3 is for a retransmission (e.g., a retransmission of a dynamically scheduled transmission, such as a transmission scheduled by the UL grant 2) based on a NDI of the UL grant 3 being set to (and/or indicative of and/or equal to) y (e.g., the second value associated with retransmission).

In some examples, if the indication is considered to be toggled, the indication indicates that the uplink grant is for a new transmission (of a first MAC PDU, for example). Alternatively and/or additionally, if the indication is considered to be not toggled, the indication indicates that the uplink grant is for a retransmission (of a second MAC PDU different than the first MAC PDU, for example). The UE may determine whether the indication is considered to be toggled or not toggled by comparing the value of the indication with a value of a second indication (e.g., the same type of indication, such as a second NDI) in a previous (and/or most recent) transmission received by the UE (e.g., a previous (and/or most recent) transmission that is for the same HARQ process as the uplink grant, for example). In an example, the indication may correspond to a first NDI of the uplink grant and/or the second indication may correspond to a second NDI of a previous uplink grant (or other type of transmission), such as a most recently received uplink grant (for the same HARQ process as the uplink grant, for example). In some examples, if the value of the indication is the same as the value of the second indication, the UE may consider the indication not to be toggled (e.g., the UE may determine that the indication is not toggled). Alternatively and/or additionally, if the value of the indication is different than the value of the second indication, the UE may consider the indication to be toggled (e.g., the UE may determine that the indication is toggled). Alternatively and/or additionally, the UE may determine whether the indication is considered to be toggled or not toggled by comparing the value of the indication with a stored value stored in the UE (or a predefined value). In an example, the stored value (or the predefined value) may be equal to a value (e.g., a specific value, such as 0) and/or the stored value may be set by the UE (such as upon and/or in response to MAC reset). In some examples, if the value of the indication is the same as the stored value (or the predefined value), the UE may consider the indication not to be toggled (e.g., the UE may determine that the indication is not toggled). Alternatively and/or additionally, if the value of the indication is different than the stored value (or the predefined value), the UE may consider the indication to be toggled (e.g., the UE may determine that the indication is toggled).

In some examples, the uplink grant may be addressed to the same RNTI (e.g., at least one of CS-RNTI, IN-RNTI, etc.) in a scenario in which the uplink grant is for a new transmission (of a first MAC PDU, for example) and in a scenario in which the uplink grant is for a retransmission (of a second MAC PDU different than the first MAC PDU, for example). In some examples, the uplink grant may be for the same HARQ process in a scenario in which the uplink grant is for a new transmission (of a first MAC PDU, for example) and in a scenario in which the uplink grant is for a retransmission (of a second MAC PDU different than the first MAC PDU, for example). The UE may be in inactive state (such as when the UE receives the uplink grant and/or when the uplink grant determines whether the uplink grant is for a new transmission (of a first MAC PDU, for example) or a retransmission (of a second MAC PDU different than the first MAC PDU, for example)).

The UE may maintain a configured grant configuration (e.g., CG type 1 configuration) in inactive state. In some examples, the uplink grant for a new transmission may not overwrite the configured grant configuration (e.g., CG type 1 configuration) in the UE. The UE may keep (and/or use and/or continue to use) the configured grant configuration after receiving the uplink grant.

In some examples, one or more rules (e.g., one or more principles) for interpreting the indication (e.g., NDI) of the uplink grant may be different for different RRC states (e.g., inactive state and/or connected mode) of the UE. For example, a first rule for interpreting the indication of the uplink grant may be applied if the UE is in connected mode (e.g., if the UE is in connected mode when the uplink grant is received and/or when the uplink grant is being interpreted by the UE) and/or a second rule for interpreting the indication of the uplink grant may be applied if the UE is in inactive state. The first rule for interpreting the indication and/or the second rule for interpreting the indication may be associated with (e.g., with respect to) the same HARQ process. For example, the first rule and/or the second rule may be applied for interpreting one or more indications of one or more uplink grants (and/or one or more other types of transmissions received by the UE) that are for the same HARQ process. For example, if the UE is in connected mode (when the uplink grant is received and/or when the uplink grant is being interpreted by the UE, for example), the UE may interpret the indication (and/or one or more other indications and/or other information in addition to the indication) based on the first rule. Alternatively and/or additionally, if the UE is in inactive state (when the uplink grant is received and/or when the uplink grant is being interpreted by the UE, for example), the UE may interpret the indication (and/or one or more other indications and/or other information in addition to the indication) based on the second rule. An example is illustrated in FIG. 8.

Figure 8:
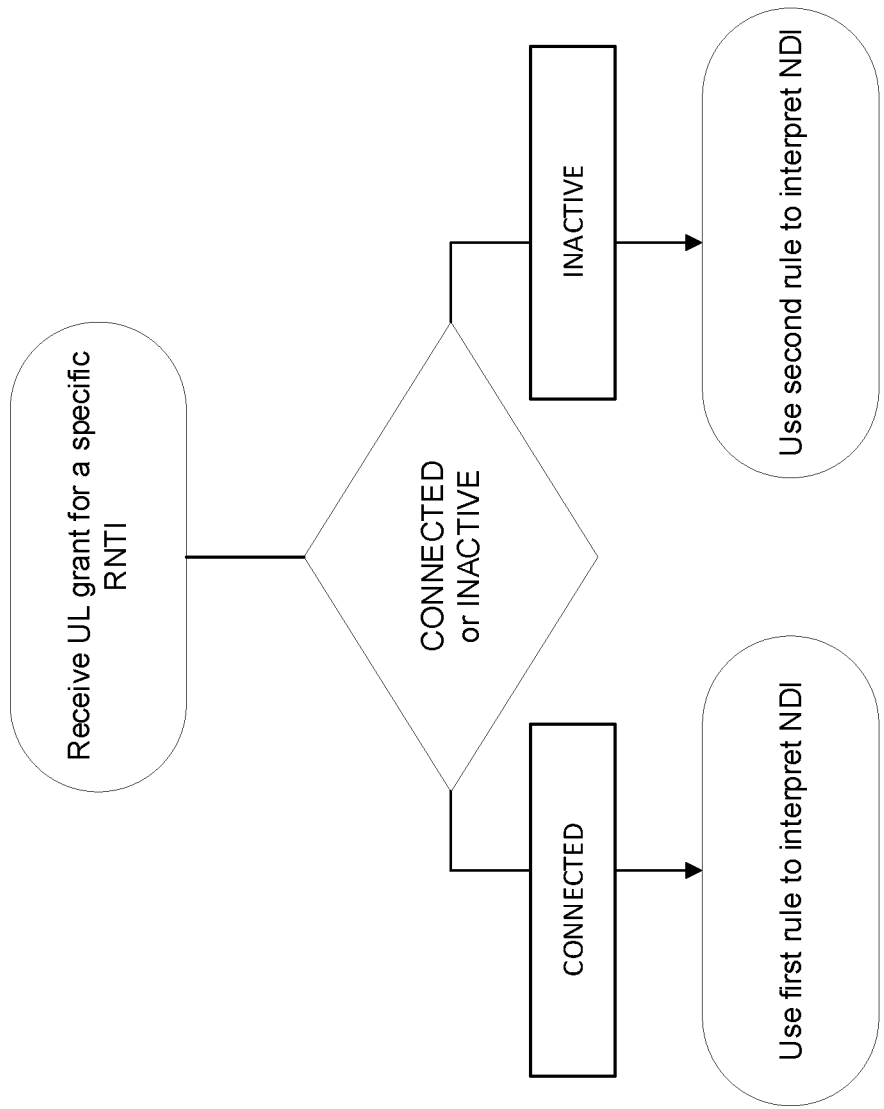
FIG. 8 is a diagram illustrating an exemplary scenario in which a UE receives an uplink grant, according to one exemplary embodiment.

FIG. 8 illustrates an example in which the UE receives the uplink grant (such as when the UE is in inactive state). The UE determines whether the UE is in connected mode or in inactive state. If the UE is in connected mode, the UE may use the first rule to interpret the NDI in the uplink grant. For example, if the UE is in connected mode, the UE may use the first rule to determine, based on the NDI, whether the uplink grant is for a new transmission (of a first MAC PDU, for example) or a retransmission (of a second MAC PDU different than the first MAC PDU, for example). If the UE is in inactive state, the UE may use the second rule to interpret the NDI in the uplink grant. For example, if the UE is in inactive state, the UE may use the second rule to determine, based on the NDI, whether the uplink grant is for a new transmission (of a first MAC PDU, for example) or a retransmission (of a second MAC PDU different than the first MAC PDU, for example).

The first rule and/or the second rule may be used to determine whether the uplink grant is for a new transmission (of a first MAC PDU, for example) or a retransmission (of a second MAC PDU different than the first MAC PDU, for example). In some examples, the first rule and/or the second rule may be one of the following rules 1-3 (wherein the first rule and the second rule are different from each other): 1) The indication being set to (and/or indicative of and/or equal to) a first value indicates that the uplink grant is for a new transmission. The indication being set to (and/or indicative of and/or equal to) a second value indicates that the uplink grant is for a retransmission. 2) A value of the indication being considered as toggled (compared to a value in a previous transmission (for the same HARQ process), for example) indicates that the uplink grant is for a new transmission. A value of the indication being considered as not toggled (compared to a value in a previous transmission (for the same HARQ process), for example) indicates that the uplink grant is for a retransmission. Whether the value of the indication is considered to be toggled or not may be similar to the foregoing description. For example, the value of the indication may be compared with a value in a previous transmission to determine whether the value is toggled or not. In an example, if the value of the indication is different than the value in the previous transmission, the UE may consider the value of the indication to be toggled, and/or if the value of the indication is the same as the value in the previous transmission, the UE may consider the value of the indication not to be toggled. Alternatively and/or additionally, the value of the indication may be compared with a stored value stored in the UE (e.g., a value that is a specific value and/or that is set by the UE, such as upon MAC reset) (or a predefined value) to determine whether the value is toggled or not. In an example, if the value of the indication is different than the stored value (or the predefined value), the UE may consider the value of the indication to be toggled, and/or if the value of the indication is the same as the stored value (or the predefined value), the UE may consider the value of the indication not to be toggled. Alternatively and/or additionally, whether the value of the indication is considered to be toggled or not may be similar to description in 3GPP TS 38.321 V15.8.0.3) The indication being set to (and/or indicative of and/or equal to) a first value indicates that the uplink grant is for a retransmission. The indication being set to (and/or indicative of and/or equal to) a second value indicates that the uplink grant is for something other than retransmission (e.g., configured grant activation and/or deactivation).

For a UE in RRC_connected, a dynamic grant for a new transmission may be transmitted on PDCCH addressed to Cell Radio Network Temporary Identifier (C-RNTI) of the UE, where a NDI in the PDCCH is considered as toggled compared to a value in a previous transmission (e.g., a transmission prior to the dynamic grant). If the NDI in the PDCCH is considered as not toggled (compared to the value in the previous transmission, for example), the uplink grant may be used for a retransmission (such as discussed in 3GPP TS 38.321 V15.8.0).

For a UE in RRC_connected, for an uplink grant on PDCCH addressed to CS-RNTI of the UE, the NDI of the uplink grant being set to (and/or indicative of and/or equal to) 0 may indicate that the uplink grant is to be used for CG type 2 activation or deactivation. Alternatively and/or additionally, the NDI of the uplink grant being set to (and/or indicative of and/or equal to) 1 may indicate that the uplink grant is to be used for a retransmission (such as discussed in 3GPP TS 38.321 V15.8.0).

In some examples, a signal associated with CG type 2 activation (e.g., signaling of a CG type 2 activation) may be used to reconfigure a CG type 1 configuration. The signal may be (and/or may comprise and/or may indicate) an uplink grant indicating CG type 2 activation (e.g., NDI in HARQ information of the signal and/or the uplink grant may be 0, which may be indicative of CG type 2 activation). The UE may be configured with a CG type 1 configuration. The UE may not be configured with a CG type 2 configuration. In response to receiving the signal (indicating CG type 2 activation), the UE may replace (and/or overwrite) the CG type 1 configuration with the uplink grant indicated by the signal. The UE may store the uplink grant indicated by the signal as a configured uplink grant. The UE may use the uplink grant for a new transmission. In some examples, the UE may be in inactive state when the UE receives the signal.

A signal associated with scheduling a retransmission of a configured scheduled transmission (e.g., signaling of scheduling a retransmission of a configured scheduled transmission) may be used to indicate a retransmission. For example, the signal may be (and/or may comprise and/or may indicate) an uplink grant indicating a retransmission (e.g., NDI in HARQ information of the signal and/or the uplink grant may be 1, which may be indicative of retransmission). The signal may be transmitted on PDCCH (e.g., PDCCH addressed to CS-RNTI). In some examples, the UE may be in inactive state when the UE receives the signal.

The CG type 1 configuration may be configured in connected mode. The CG type 1 configuration is to be used in inactive state (e.g., the UE may be configured to use the CG type 1 configuration in inactive state).

In some examples, a HARQ process indicated by an uplink grant may be used (by the UE, for example) to determine whether the uplink grant is for a new transmission (e.g., a dynamically scheduled transmission) or a retransmission (e.g., a retransmission of a configured scheduled transmission). The new transmission may correspond to a transmission of a first MAC PDU, for example. The retransmission may correspond to a retransmission of a second MAC PDU different than the first MAC PDU, for example. If the HARQ process belongs to (e.g., is included in) a first set of HARQ processes (e.g., a specific set of HARQ processes), the UE may determine that the uplink grant is for a retransmission (e.g., a retransmission of a configured scheduled transmission) and/or the uplink grant may be used for a retransmission. If the HARQ process does not belong to the first set of HARQ processes, the UE may determine that the uplink grant is for a new transmission (e.g., a dynamically scheduled transmission) and/or the uplink grant may be used for a new transmission. Alternatively and/or additionally, if the HARQ process does not belong to the first set of HARQ processes, the UE may determine that the uplink grant is for a retransmission of the dynamically scheduled transmission. For example, the HARQ process indicated by the uplink grant not belonging to the first set of HARQ processes may indicate that the uplink grant is to be used for a new dynamically scheduled transmission or a retransmission of a dynamically scheduled transmission. If the HARQ process indicated by the uplink grant does not belong to the first set of HARQ processes, the UE may determine whether the uplink grant is to be used for a new dynamically scheduled transmission or a retransmission of a dynamically scheduled transmission based on the uplink grant, such as based on a NDI field of the uplink grant. An example is illustrated in FIG. 9.

Figure 9:
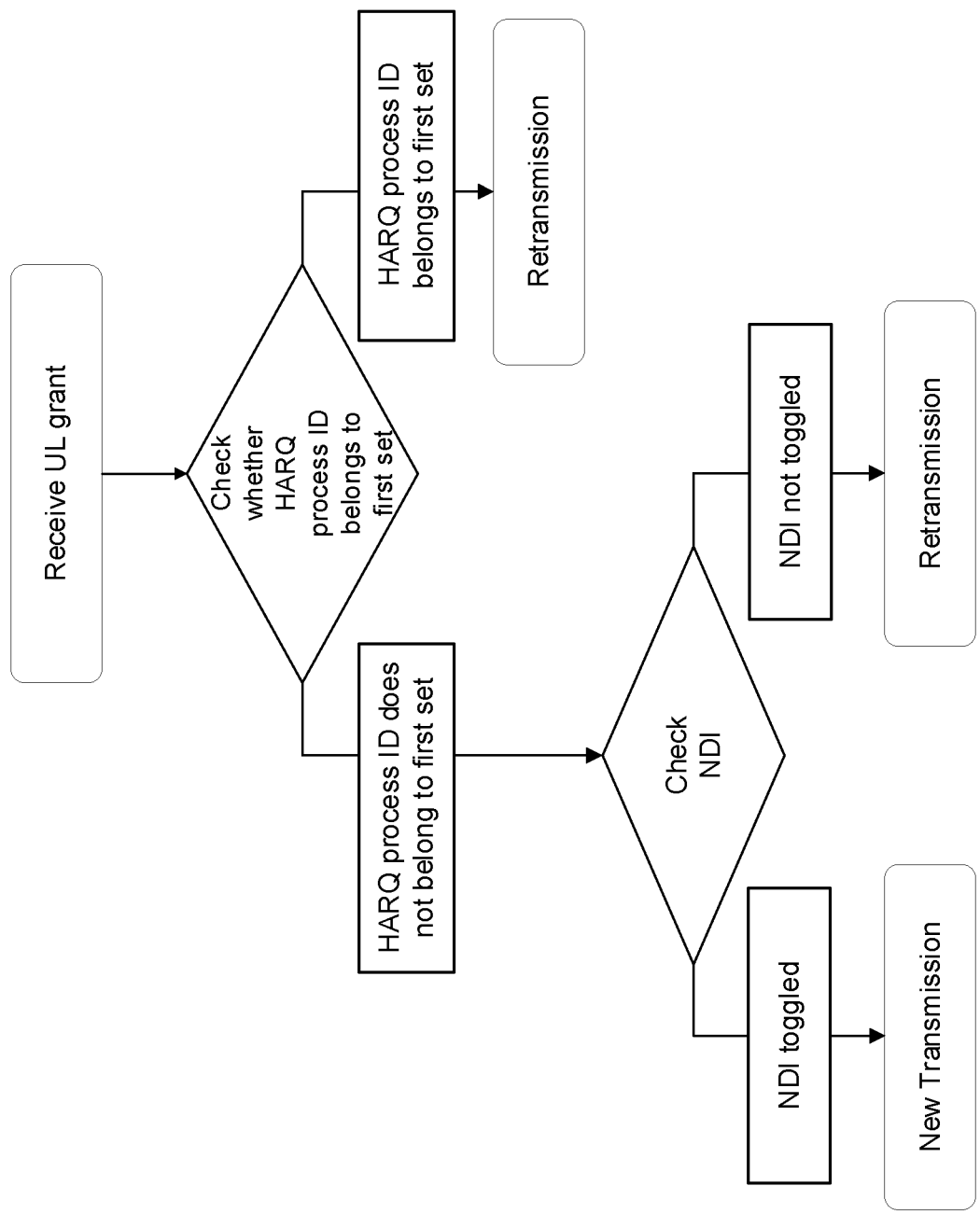
FIG. 9 is a diagram illustrating an exemplary scenario in which a UE receives an uplink grant, according to one exemplary embodiment.

FIG. 9 illustrates an example in which the UE receives the uplink grant (such as when the UE is in inactive state). The UE may check whether a HARQ process indicated by the uplink grant belongs to the first set of HARQ processes. For example, the UE may determine whether the HARQ process belongs to the first set of HARQ processes by determining whether a HARQ process ID indicated by the uplink grant belongs to a first set of HARQ process IDs associated with the first set of HARQ processes. If the HARQ process ID belongs to the first set of HARQ process IDs, the UE may determine that the uplink grant is to be used for a retransmission (e.g., a retransmission of a configured scheduled transmission). If the HARQ process ID does not belong to the first set of HARQ process IDs, the UE may determine that the uplink grant is to be used for a new dynamically scheduled transmission or a retransmission of a dynamically scheduled transmission. The UE may use the NDI of the uplink grant to determine whether the uplink grant is to be used for a new dynamically scheduled transmission or a retransmission of a dynamically scheduled transmission. For example, if the NDI is considered to be toggled (e.g., if the UE determines that the NDI is toggled with respect to a previous transmission and/or a stored value (and/or a predefined value) using one or more of the techniques described herein), the UE may determine that the uplink grant is to be used for a new dynamically scheduled transmission. Alternatively and/or additionally, if the NDI is not considered to be toggled (e.g., if the UE determines that the NDI is not toggled with respect to a previous transmission and/or a stored value (and/or a predefined value) using one or more of the techniques described herein), the UE may determine that the uplink grant is to be used for a retransmission of a dynamically scheduled transmission.

The first set of HARQ processes may be reserved for configured scheduled transmission (and retransmission of configured scheduled transmissions, for example). For example, a HARQ process in the first set of HARQ processes may be reserved and/or used for a configured scheduled transmission (and/or a retransmission of a configured scheduled transmission). In some examples, a HARQ process in the first set of HARQ processes may not be used for a dynamically scheduled transmission (and/or may not be used for a dynamically scheduled new transmission).

Alternatively and/or additionally, a HARQ process not in the first set of HARQ processes may be used for a dynamically scheduled transmission (e.g., a new dynamically scheduled transmission and/or a retransmission of a dynamically scheduled transmission). In some examples, a HARQ process not in the first set of HARQ processes may not be used for a configured scheduled transmission (and/or may not be used for a retransmission of a configured scheduled transmission).

In some examples, a HARQ process ID of a HARQ process in the first set of HARQ processes may fulfil the following equation: HARQ Process ID=[floor(CURRENT_symbol/periodicity)] modulo nrofHARQ-Processes (such as discussed in 3GPP TS 38.321 V15.8.0).

Alternatively and/or additionally, a HARQ process ID of a HARQ process in the first set of HARQ processes may fulfil the following equation: HARQ Process ID=[floor(CURRENT_symbol/periodicity)] modulo nrofHARQ-Processes+HARQ_ID_Offset.

In some examples, if a HARQ process indicated by an uplink grant belongs to the first set of HARQ processes, the UE may interpret a field (e.g., NDI) in a DCI of the uplink grant (and/or the UE may interpret other information associated with the uplink grant in addition to the field) using (and/or based on) a first rule. Alternatively and/or additionally, if a HARQ process indicated by the uplink grant does not belong to the first set of HARQ processes, the UE may interpret the field (e.g., NDI) in the DCI of the uplink grant (and/or the UE may interpret other information associated with the uplink grant in addition to the field) using (and/or based on) a second rule.

The first rule and/or the second rule may be used to determine whether the uplink grant is for a new transmission (of a first MAC PDU, for example) or a retransmission (of a second MAC PDU different than the first MAC PDU, for example). In some examples, the first rule and/or the second rule may be one of the following rules 1-3 (wherein the first rule and the second rule are different from each other): 1) The field being set to (and/or indicative of and/or equal to) a first value indicates that the uplink grant is for a new transmission. The field being set to (and/or indicative of and/or equal to) a second value indicates that the uplink grant is for a retransmission. 2) A value of the field being considered as toggled (compared to a value in a previous transmission (for the same HARQ process), for example) indicates that the uplink grant is for a new transmission. A value of the field being considered as not toggled (compared to a value in a previous transmission (for the same HARQ process), for example) indicates that the uplink grant is for a retransmission. Whether the value of the field is considered to be toggled or not may be similar to the foregoing description. For example, the value of the field may be compared with a value in a previous transmission to determine whether the value is toggled or not. In an example, if the value of the field is different than the value in the previous transmission, the UE may consider the value of the field to be toggled, and/or if the value of the field is the same as the value in the previous transmission, the UE may consider the value of the field not to be toggled. Alternatively and/or additionally, the value of the field may be compared with a stored value stored in the UE (e.g., a value that is a specific value and/or that is set by the UE, such as upon MAC reset) (or a predefined value) to determine whether the value is toggled or not. In an example, if the value of the field is different than the stored value (or the predefined value), the UE may consider the value of the field to be toggled, and/or if the value of the field is the same as the stored value (or the predefined value), the UE may consider the value of the field not to be toggled. Alternatively and/or additionally, whether the value of the field is considered to be toggled or not may be similar to description in 3GPP TS 38.321 V15.8.0.3) The field being set to (and/or indicative of and/or equal to) a first value indicates that the uplink grant is for a retransmission. The field being set to (and/or indicative of and/or equal to) a second value indicates that the uplink grant is for something other than retransmission (e.g., configured grant activation and/or deactivation).

In some examples, a RNTI that the uplink grant is addressed to is used (by the UE, for example) to determine whether the uplink grant is for a new transmission (of a first MAC PDU, for example) or a retransmission (of a second MAC PDU different than the first MAC PDU, for example). The UE may monitor more than one RNTI (e.g., 2 different RNTIs or more than 2 RNTIs) that can indicate one or more uplink grants.

For example, the UE may maintain RNTIs (e.g., two RNTIs that can indicate one or more uplink grants). One of the RNTIs (e.g., a first RNTI of the RNTIs) may schedule a retransmission (e.g., of a configured scheduled transmission). One of the RNTIs (e.g., the first RNTI) may not schedule a new transmission (e.g., a new transmission of a configured scheduled transmission). One of the RNTIs (e.g., a second RNTI) may schedule a new transmission and/or a retransmission (e.g., a new dynamically scheduled transmission and/or a retransmission of a dynamically scheduled transmission).

One or more of the RNTIs (e.g., the first RNTI and/or the second RNTI) may be CS-RNTI. One or more of the RNTIs (e.g., the first RNTI and/or the second RNTI) may be C-RNTI. One or more of the RNTIs (e.g., the first RNTI and/or the second RNTI) may be IN-RNTI. The first RNTI may be different from the second RNTI. One or more of the RNTIs (e.g., the first RNTI and/or the second RNTI) may be applicable in connected mode and inactive state (e.g., the one or more of the RNTIs may be used and/or monitored by the UE in connected mode and inactive state). One or more of the RNTIs (e.g., the first RNTI and/or the second RNTI) may be applicable specific to inactive state. One or more of the RNTIs (e.g., the first RNTI and/or the second RNTI) may not be applicable in connected mode. One or more of the RNTIs (e.g., the first RNTI and/or the second RNTI) that are used in inactive state may be inherited from connected mode (e.g., the one or more of the RNTIs may be used in connected mode and reused in inactive state). One or more of the RNTIs (e.g., the first RNTI and/or the second RNTI) used in inactive state may be configured (by a network) in connected mode and may be configured to be used in inactive state (e.g., the UE may be configured with the one or more of the RNTIs when the UE is in connected mode and/or the UE may be configured to use the one or more of the RNTIs when the UE is in inactive state).

In some examples, if an uplink grant is addressed to a first RNTI (e.g., IN-RNTI) of the UE, the UE may determine that the uplink grant is for a new transmission (of a first MAC PDU, for example). Alternatively and/or additionally, if an uplink grant is addressed to a second RNTI (e.g., CS-RNTI) of the UE, the UE may determine that the uplink grant is for a retransmission (of a second MAC PDU different than the first MAC PDU, for example). Examples are illustrated in FIGS. 10-11.

Figure 10:
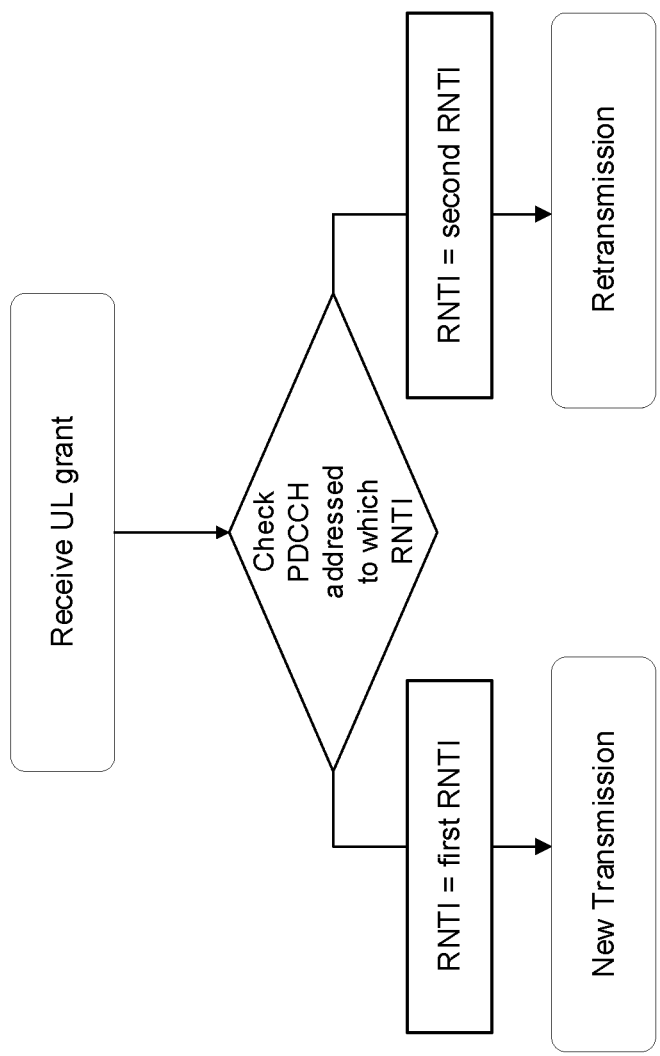
FIG. 10 is a diagram illustrating an exemplary scenario in which a UE receives an uplink grant, according to one exemplary embodiment.

FIG. 10 illustrates an example in which the UE receives an uplink grant (such as when the UE is in inactive state). The UE checks a RNTI to which the uplink grant is addressed to determine whether the uplink grant is for a new transmission or a retransmission. For example, a PDCCH on which the uplink grant is signaled may be addressed to the RNTI. The UE determines that the uplink grant is for a new transmission based on the RNTI being equal to the first RNTI. Alternatively and/or additionally, the UE determines that the uplink grant is for a retransmission based on the RNTI being equal to the second RNTI.

Figure 11:
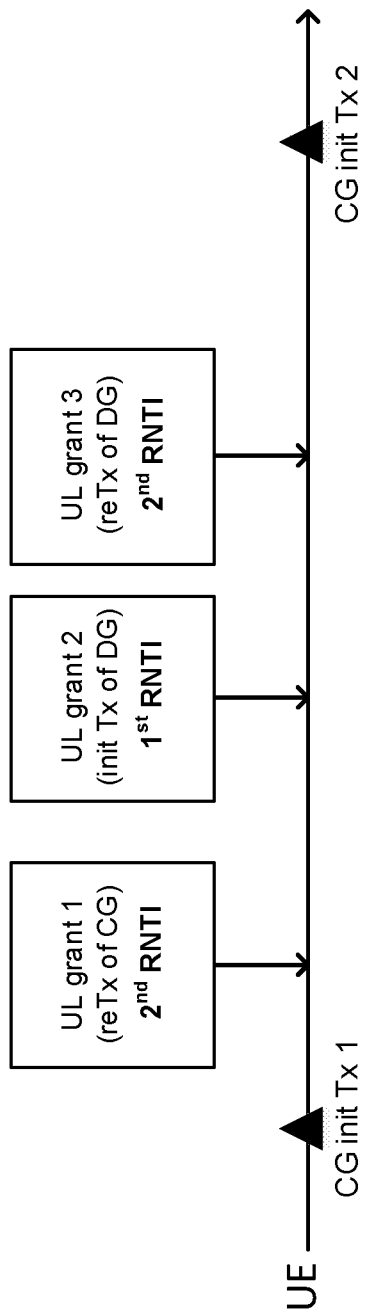
FIG. 11 is a diagram illustrating an exemplary scenario in which a UE receives uplink grants, according to one exemplary embodiment.

FIG. 11 illustrates an example in which the UE (a timeline of which his labeled "UE" in FIG. 11) receives uplink grants comprising UL grant 1, UL grant 2 and/or UL grant 3 (such as when the UE is in inactive state). The UE may determine that the UL grant 1 is for a retransmission (e.g., a retransmission of a configured scheduled transmission, such as a transmission scheduled by a configured grant) based on the UL grant 1 being addressed to the second RNTI. The UE may determine that the UL grant 2 is for a new transmission (e.g., a dynamically scheduled transmission) based on the UL grant 2 being addressed to the first RNTI. The UE may determine that the UL grant 3 is for a retransmission (e.g., a retransmission of a dynamically scheduled transmission, such as a transmission scheduled by the UL grant 2) based on the UL grant 3 being addressed to the second RNTI.

A first field in the uplink grant may be set to (and/or indicative of and/or equal to) a value (e.g., a fixed value). The first field may be used to determine whether an uplink grant is for a new transmission (of a first MAC PDU, for example) or a retransmission (of a second MAC PDU different than the first MAC PDU, for example) when the UE is in connected mode (e.g., RRC_connected). The first field may be a new data indicator (NDI). The first field may be included in downlink control information (DCI) of the uplink grant. The first field may be included in HARQ information of the uplink grant. The first field may be signaled via PDCCH.

The first field (e.g., NDI) and RNTI may be taken into account to determine whether an uplink grant is for a new transmission (of a first MAC PDU, for example) or a retransmission (of a second MAC PDU different than the first MAC PDU, for example). For example, if an uplink grant is addressed to a first RNTI (e.g., CS-RNTI), the UE may determine that the uplink grant is for a retransmission. Alternatively and/or additionally, if an uplink grant is addressed to a second RNTI (e.g., C-RNTI and/or IN-RNTI), the UE may determine whether the uplink grant is for a new transmission (of a first MAC PDU, for example) or retransmission (of a second MAC PDU different than the first MAC PDU, for example) based on the first field (e.g., NDI). Examples are illustrated in FIGS. 12-13.

Figure 12:
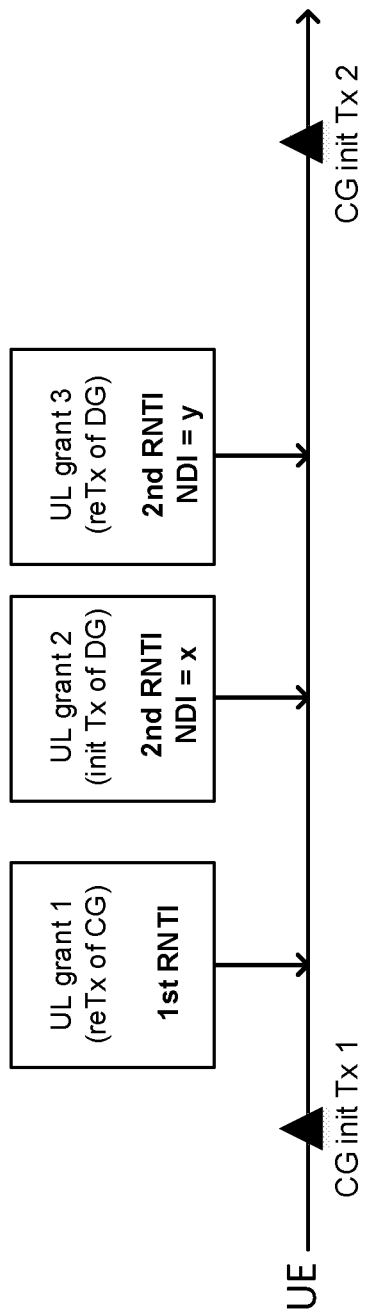
FIG. 12 is a diagram illustrating an exemplary scenario in which a UE receives uplink grants, according to one exemplary embodiment.

FIG. 12 illustrates an example in which the UE (a timeline of which his labeled "UE" in FIG. 12) receives uplink grants comprising UL grant 1, UL grant 2 and/or UL grant 3 (such as when the UE is in inactive state). The UE may determine that the UL grant 1 is for a retransmission (e.g., a retransmission of a configured scheduled transmission, such as a transmission scheduled by a configured grant) based on the UL grant 1 being addressed to the first RNTI. The UE may determine that the UL grant 2 is for a new transmission (e.g., a dynamically scheduled transmission) based on the UL grant 2 being addressed to the second RNTI and a field (e.g., NDI) of the UL grant being equal to a first value (e.g., x). The UE may determine that the UL grant 3 is for a retransmission (e.g., a retransmission of a dynamically scheduled transmission, such as a transmission scheduled by the UL grant 2) based on the UL grant 3 being addressed to the second RNTI and a field (e.g., NDI) of the UL grant 3 being equal to a second value (e.g., y).

Figure 13:
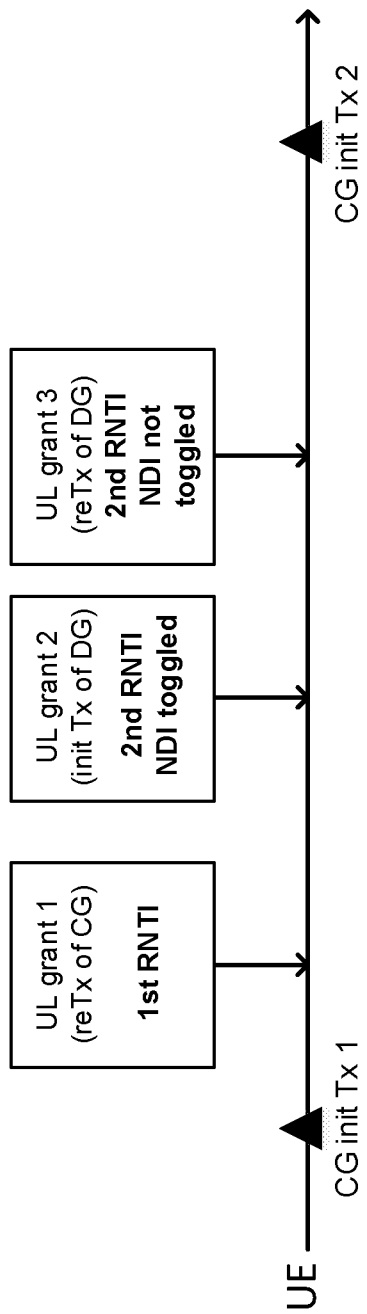
FIG. 13 is a diagram illustrating an exemplary scenario in which a UE receives uplink grants, according to one exemplary embodiment.

FIG. 13 illustrates an example in which the UE (a timeline of which his labeled "UE" in FIG. 13) receives uplink grants comprising UL grant 1, UL grant 2 and/or UL grant 3 (such as when the UE is in inactive state). The UE may determine that the UL grant 1 is for a retransmission (e.g., a retransmission of a configured scheduled transmission, such as a transmission scheduled by a configured grant) based on the UL grant 1 being addressed to the first RNTI. The UE may determine that the UL grant 2 is for a new transmission (e.g., a dynamically scheduled transmission) based on the UL grant 2 being addressed to the second RNTI and a field (e.g., NDI) of the UL grant 2 being considered to be toggled (e.g., the UE determines that the NDI is toggled with respect to a previous transmission and/or a stored value (and/or a pre-defined value) using one or more of the techniques described herein). The UE may determine that the UL grant 3 is for a retransmission (e.g., a retransmission of a dynamically scheduled transmission, such as a transmission scheduled by the UL grant 2) based on the UL grant 3 being addressed to the second RNTI and a field (e.g., NDI) of the UL grant 3 being considered not toggled (e.g., the UE determines that the NDI is not toggled with respect to a previous transmission and/or a stored value (and/or a predefined value) using one or more of the techniques described herein).

For a UE in connected mode (e.g., RRC_connected), the UE may determine that an uplink grant is for a new transmission (of a first MAC PDU, for example) if the uplink grant is addressed to a first RNTI (e.g., C-RNTI) and a first field (e.g., NDI) in the uplink grant is considered as toggled (e.g., whether or not the UE considers the first field to be toggled may be according to one or more of the techniques described herein and/or description in 3GPP TS 38.321 V15.8.0).

For a UE in connected mode (e.g., RRC_connected), the UE may determine that an uplink grant is for a retransmission (of a second MAC PDU different than the first MAC PDU, for example) (e.g., a retransmission of a configured scheduled transmission of the second MAC PDU) if the uplink grant is addressed to a second RNTI (e.g., CS-RNTI) and the first field (e.g., NDI) is set to (and/or indicative of and/or equal to) a value (e.g., a specific value, such as 0).

In some examples, one or more techniques, methods and/or operations of the present disclosure, such as for determining whether an uplink grant is for a new transmission or a retransmission (and/or for using the uplink grant for a new transmission or a retransmission), may be applied and/or performed by a UE if one or more of the following conditions are met: 1) The UE is in inactive state (such as when the uplink grant is received and/or when the UE determines whether the uplink grant is for a new transmission or a retransmission). 2) The uplink grant is received in a time period (e.g., a specific time period and/or a time window and/or offset after a configured scheduled transmission). 3) The uplink grant is received when a timer is running (e.g., the timer may be a configuredGrantTimer, such as discussed in 3GPP TS 38.321 V15.8.0). 4) The uplink grant is associated with (e.g., the uplink grant is used by and/or is for performance of) one or more HARQ processes (e.g., one or more specific HARQ processes). The one or more HARQ processes may be identified by one or more HARQ process IDs associated with the one or more HARQ processes. The one or more HARQ processes may be configured for configured scheduled transmission (e.g., potential configured scheduled transmission). The DCI of the uplink grant may indicate a HARQ process (e.g., the DCI may be indicative of a HARQ process ID associated with the HARQ process) among the one or more HARQ processes. For example, the UE may determine that condition 4 is met based on a determination that a HARQ process ID indicated by the DCI matches a HARQ process ID of the one or more HARQ process IDs associated with the one or more HARQ processes. 5) The PDCCH carrying the uplink grant is addressed to a RNTI that corresponds to one or more first RNTIs (e.g., one or more specific RNTIs, such as CS-RNTI and/or IN-RNTI).

In some examples, one or more techniques, methods and/or operations of the present disclosure, such as for determining whether an uplink grant is for a new transmission or a retransmission (and/or for using the uplink grant for a new transmission or a retransmission), may not be applied and/or may not be performed by a UE if one or more of the following conditions are met: 1) The UE is in connected mode (such as when the uplink grant is received and/or when the UE determines whether the uplink grant is for a new transmission or a retransmission). 2) The UE is in idle mode (such as when the uplink grant is received and/or when the UE determines whether the uplink grant is for a new transmission or a retransmission). 3) The uplink grant is received outside a time period (e.g., a specific time period and/or a time window and/or offset after a configured scheduled transmission). 4) The uplink grant is received when a timer is not running (e.g., the timer may be a configuredGrantTimer, such as discussed in 3GPP TS 38.321 V15.8.0). 5) The uplink grant is not associated with (e.g., the uplink grant is not used by and/or is not for performance of) one or more HARQ processes (e.g., one or more specific HARQ processes). The one or more HARQ processes may be identified by one or more HARQ process IDs associated with the one or more HARQ processes. The one or more HARQ processes may be configured for configured scheduled transmission (e.g., potential configured scheduled transmission). The DCI of the uplink grant may indicate a HARQ process (e.g., the DCI may be indicative of a HARQ process ID associated with the HARQ process) that is not among the one or more HARQ processes. For example, the UE may determine that condition 5 is met based on a determination that a HARQ process ID indicated by the DCI does not match a HARQ process ID (e.g., any HARQ process ID) of the one or more HARQ process IDs associated with the one or more HARQ processes. 6) The PDCCH carrying the uplink grant is not addressed to a RNTI that corresponds to one or more first RNTIs (e.g., one or more specific RNTIs, such as CS-RNTI and/or IN-RNTI).

With respect to one or more embodiments herein, in some examples, the new transmission may be a dynamically scheduled transmission. Alternatively and/or additionally, the new transmission may be a configured scheduled transmission.

With respect to one or more embodiments herein, in some examples, the retransmission may be a dynamically scheduled transmission. Alternatively and/or additionally, the retransmission may be a configured scheduled transmission.

With respect to one or more embodiments herein, in some examples, the dynamically scheduled transmission may be a transmission scheduled by a dynamic uplink grant.

With respect to one or more embodiments herein, in some examples, the configured scheduled transmission may be a transmission scheduled by a configured uplink grant.

With respect to one or more embodiments herein, in some examples, the first RNTI may be applicable (and/or used and/or monitored) in connected mode. Alternatively and/or additionally, the first RNTI may be applicable (and/or used and/or monitored) in inactive state.

With respect to one or more embodiments herein, in some examples, the second RNTI may be applicable (and/or used and/or monitored) in connected mode. Alternatively and/or additionally, the second RNTI may be applicable (and/or used and/or monitored) in inactive state.

With respect to one or more embodiments herein, in some examples, the first RNTI may not be applicable in connected mode. Alternatively and/or additionally, the second RNTI may not be applicable in connected mode.

With respect to one or more embodiments herein, in some examples, the UE may be in inactive state. Alternatively and/or additionally, the UE may be in connected mode.

With respect to one or more embodiments herein, in some examples, the configured grant (e.g., CG type 1) may be a configured grant for which a related configuration of the configured grant (e.g., all of the related configuration) is provided by RRC (e.g., such as via ConfiguredGrantConfig IE). The configured grant (e.g., CG type 1) may not be activated and/or deactivated by PDCCH. A UE may consider the configured grant (e.g., CG type 1) to be activated when the configured grant (e.g., CG type 1) is configured, such as via the ConfiguredGrantConfig IE (and/or the UE may consider the configured grant to be configured in response to and/or upon the configured grant being configured). The UE may consider the configured grant (e.g., CG type 1) to be deactivated when the configured grant (e.g., CG type 1) is de-configured (and/or the UE may consider the configured grant to be deactivated in response to and/or upon the configured grant being de-configured). Alternatively and/or additionally, the configured grant (e.g., CG type 1) may not have activation and/or deactivation functionality (e.g., the configured grant may not be activated and/or deactivated via PDCCH).

With respect to one or more embodiments herein, in some examples, the configured grant (e.g., CG type 2) may be a configured grant for which a first part of a related configuration of the configured grant is provided by RRC (e.g., via ConfiguredGrantConfig IE) and a second part of the related configuration of the configured grant is provided by PDCCH (e.g., via DCI addressed to CS-RNTI). The configured grant (e.g., CG type 2) may be activated and/or deactivated by PDCCH. A UE may consider the configured grant (e.g., CG type 2) as activated upon (and/or in response to) receiving activation on PDCCH. The UE may consider the configured grant (e.g., CG type 2) as deactivated upon (and/or in response to) receiving deactivation on PDCCH.

With respect to one or more embodiments herein, in some examples, the configured grant (e.g., CG type 1) configuration may comprise ConfiguredGrantConfig, a parameter for frequency hopping, cg-DMRS-Configuration, Modulation and Coding scheme (MCS) table, MCS table transform precoder, uci-OnPUSCH, resource allocation, resource block group (RBG) size, power control loop to use, p0-PUSCH-Alpha, transform precoder, number of HARQ processes, repK, repK-R V, periodicity, and/or configured grant timer (such as discussed in 3GPP TS 38.331 V15.8.0).

With respect to one or more embodiments herein, in some examples, the configured grant (e.g., CG type 1) configuration may comprise rrc-ConfiguredUplinkGrant, time domain offset, time domain allocation, frequency domain allocation, antenna port, dmrs-SeqInitialization, precodingAndNumberOfLayers, Sounding Reference Signal (SRS) resource indicator, MCS and Transport Block Size (TBS), frequency hopping offset, and/or pathloss reference index (such as discussed in 3GPP TS 38.331 V15.8.0).

With respect to one or more embodiments herein, in some examples, the configured grant (e.g., CG type 1) configuration (e.g., configured grant configuration for inactive state) may comprise a time alignment timer value for inactive state configured grant (e.g., CG type 1) usage, one or more parameters used to validate Timing Advance and/or Timing Alignment (TA) in inactive state, a number used for implicit release (e.g., a number of consecutive occasions that can be skipped before implicit release) of configured grant (e.g., CG type 1) in inactive state, a RNTI used in inactive state, and/or a window size to be monitored in inactive state.

With respect to one or more embodiments herein, in some examples, the UE may be a NR light device (and/or a reduced capability NR device). Alternatively and/or additionally, the UE may be a stationary device. Alternatively and/or additionally, the UE may not have mobility capability. Alternatively and/or additionally, the UE may have low mobility capability.

With respect to one or more embodiments herein, in some examples, the network may be a network node. Alternatively and/or additionally, the network node may control a serving cell of a UE. In some examples, the serving cell may be Primary Cell (PCell). Alternatively and/or additionally, the serving cell may be Secondary Cell (SCell). Alternatively and/or additionally, the network node may control a cell group of a UE. In some examples, the cell group may be Master Cell Group (MCG). Alternatively and/or additionally, the cell group may be Secondary Cell Group (SCG).

With respect to one or more embodiments herein, in some examples, a new transmission, may correspond to a transmission of data (e.g., a MAC PDU) that is not a retransmission of the data. For example, a new transmission may correspond to an initial transmission of data (e.g., a MAC PDU) after the data becomes available for transmission (at the UE, for example).

In some examples, one or more techniques, methods and/or operations of the present disclosure, described with respect to inactive state may also be applied to idle mode (or RRC_IDLE state). For example, "inactive state" in the present disclosure may be changed to "idle mode" (or "RRC_IDLE state"). In some examples, one or more techniques, methods and/or operations of the present disclosure may be applied to both idle mode and inactive state. Alternatively and/or additionally, one or more techniques, methods and/or operations of the present disclosure may be applied to idle mode but not applied to inactive state.

In some examples, a UE may be configured with one or more configured grant timers. When a configured grant timer (of the one or more configured grant timers) is running, the UE may not use a configured grant for a new transmission (such as discussed in 3GPP TS 38.331 V15.8.0). Considering that use cases of using a configured grant may be different in connected mode and inactive state, a configured grant timer should be handled and/or controlled appropriately when the UE enters connected mode from inactive state.

When (and/or in response to) the UE enters connected mode from inactive state, the configured grant timer may be stopped (e.g., the configured grant timer may be stopped if the configured grant timer is running when and/or after the UE enters connected mode from inactive state). Alternatively and/or additionally, when (and/or in response to) the UE enters connected mode from inactive state, the configured grant timer may be started (and/or restarted).

The configured grant timer may be running when the UE is in inactive state. The configured grant timer may be running when the UE enters connected mode from inactive state.

In some examples, the configured grant timer is configured in and/or using a configured grant configuration. The configured grant configuration may be a connected mode configured grant configuration. The configured grant configuration may be an inactive state configured grant configuration. Each configured grant timer of the one or more configured grant timers may be associated with a HARQ process (e.g., a specific HARQ process of one or more HARQ processes).

The configured grant timer may be started (and/or restarted) with a value configured in the connected mode configured grant configuration (e.g., the connected mode configured grant configuration may be indicative of the value with which the configured grant time starts and/or restarts). The configured grant timer may be started (and/or restarted) with a value configured in the inactive state configured grant configuration (e.g., the inactive state configured grant configuration may be indicative of the value with which the configured grant time starts and/or restarts).

The UE may be configured with multiple Bandwidth Parts (BWPs) (e.g., the multiple BWPs may be for the UE in connected mode and/or may be used by the UE in connected mode). The configured grant configuration (e.g., CG type 1 configuration, CG type 2 configuration, connected mode configured grant configuration and/or inactive state configured grant configuration) may be specific to, indicative of, and/or used in association with a BWP (among the multiple BWPs, for example). In some examples, the connected mode configured grant configuration and the inactive state configured grant configuration may be associated with (e.g., belong to and/or be indicative of) a same BWP (among the multiple BWPs, for example). Alternatively and/or additionally, the connected mode configured grant configuration and the inactive state configured grant configuration may be associated with (e.g., belong to and/or be indicative of) different BWPs (among the multiple BWPs, for example). In some examples, the CG type 1 configuration and the CG type 2 configuration may be associated with (e.g., belong to and/or be indicative of) a same BWP (among the multiple BWPs, for example). Alternatively and/or additionally, the CG type 1 configuration and the CG type 2 configuration may be associated with (e.g., belong to and/or be indicative of) different BWPs (among the multiple BWPs, for example). In some examples, the BWP may be a default BWP. Alternatively and/or additionally, the BWP may be an initial BWP. Alternatively and/or additionally, the BWP may be a dedicated BWP configured to the UE (e.g., the UE may be configured with the dedicated BWP). Alternatively and/or additionally, the BWP may be a BWP (e.g., a specific BWP) indicated by the network. In some examples, the UE may be configured with one or more BWPs (and/or only one BWP) that may be for the UE in inactive state and/or may be used by the UE in inactive state.

In some examples, the configured grant (e.g., CG type 1) may be a configured grant for which a related configuration of the configured grant (e.g., all of the related configuration) is provided by RRC (e.g., such as via ConfiguredGrantConfig IE). The configured grant (e.g., CG type 1) may not be activated and/or deactivated by PDCCH. A UE may consider the configured grant (e.g., CG type 1) to be activated when the configured grant (e.g., CG type 1) is configured, such as via the ConfiguredGrantConfig IE (and/or the UE may consider the configured grant to be configured in response to and/or upon the configured grant being configured). The UE may consider the configured grant (e.g., CG type 1) to be deactivated when the configured grant (e.g., CG type 1) is de-configured (and/or the UE may consider the configured grant to be deactivated in response to and/or upon the configured grant being de-configured). Alternatively and/or additionally, the configured grant (e.g., CG type 1) may not have activation and/or deactivation functionality (e.g., the configured grant may not be activated and/or deactivated via PDCCH).

In some examples, the configured grant (e.g., CG type 2) may be a configured grant for which a first part of a related configuration of the configured grant is provided by RRC (e.g., via ConfiguredGrantConfig IE) and a second part of the related configuration of the configured grant is provided by PDCCH (e.g., via DCI addressed to CS-RNTI). The configured grant (e.g., CG type 2) may be activated and/or deactivated by PDCCH. A UE may consider the configured grant (e.g., CG type 2) as activated upon (and/or in response to) receiving activation on PDCCH. The UE may consider the configured grant (e.g., CG type 2) as deactivated upon (and/or in response to) receiving deactivation on PDCCH.

In some examples, the connected mode configured grant configuration may be a configured grant configuration applicable in connected mode (e.g., the UE may use and/or apply the connected mode configured grant configuration when the UE is in connected mode). For example, the connected mode configured grant configuration may be a configured grant configuration that a connected mode UE (e.g., a UE in connected mode) uses and/or applies.

For example, the connected mode CG type 1 configuration may be a CG type 1 configuration applicable in connected mode (e.g., the UE may use and/or apply the connected mode CG type 1 configuration when the UE is in connected mode). For example, the connected mode CG type 1 configuration may be a CG type 1 configuration that a connected mode UE (e.g., a UE in connected mode) uses and/or applies.

Alternatively and/or additionally, the connected mode CG type 2 configuration may be a CG type 2 configuration applicable in connected mode (e.g., the UE may use and/or apply the connected mode CG type 2 configuration when the UE is in connected mode). The connected mode CG type 2 configuration may be a CG type 2 configuration that a connected mode UE uses and/or applies.

In some examples, the connected mode configured grant configuration (e.g., the connected mode CG type 1 configuration and/or the connected mode CG type 2 configuration) configuration may not be applicable in inactive state (unless otherwise indicated). For example, the UE may not use and/or apply the connected mode configured grant configuration (e.g., the connected mode CG type 1 configuration and/or the connected mode CG type 2 configuration) when the UE is in inactive state.

In some examples, the inactive state configured grant configuration may be a configured grant configuration applicable in inactive state (e.g., the UE may use and/or apply the inactive state configured grant configuration when the UE is in inactive state). For example, the inactive state configured grant configuration may be a configured grant configuration that an inactive state UE (e.g., a UE in inactive state) uses and/or applies.

For example, the inactive state CG type 1 configuration may be a CG type 1 configuration applicable in inactive state (e.g., the UE may use and/or apply the inactive state CG type 1 configuration when the UE is in inactive state). For example, the inactive state CG type 1 configuration may be a CG type 1 configuration that an inactive state UE (e.g., a UE in inactive state) uses and/or applies.

Alternatively and/or additionally, the inactive state CG type 2 configuration may be a CG type 2 configuration applicable in inactive state (e.g., the UE may use and/or apply the inactive state CG type 2 configuration when the UE is in inactive state). The inactive state CG type 2 configuration may be a CG type 2 configuration that an inactive state UE uses and/or applies.

In some examples, the inactive state configured grant configuration (e.g., the inactive state CG type 1 configuration and/or the inactive state CG type 2 configuration) configuration may not be applicable in connected mode (unless otherwise indicated). For example, the UE may not use and/or apply the inactive state configured grant configuration (e.g., the inactive state CG type 1 configuration and/or the inactive state CG type 2 configuration) when the UE is in connected mode.

In some examples, the configured grant (e.g., CG type 1) configuration may comprise ConfiguredGrantConfig, a parameter for frequency hopping, cg-DMRS-Configuration, MCS table, MCS table transform precoder, uci-OnPUSCH, resource allocation, RBG size, power control loop to use, p0-PUSCH-Alpha, transform precoder, number of HARQ processes, repK, repK-RV, periodicity, and/or configured grant timer (such as discussed in 3GPP TS 38.331 V15.8.0).

In some examples, the configured grant (e.g., CG type 1) configuration may comprise rrc-ConfiguredUplinkGrant, time domain offset, time domain allocation, frequency domain allocation, antenna port, dmrs-SeqInitialization, pre-codingAndNumberOfLayers, SRS resource indicator, MCS and TBS, frequency hopping offset, and/or pathloss reference index (such as discussed in 3GPP TS 38.331 V15.8.0).

In some examples, the configured grant (e.g., CG type 1) configuration (e.g., inactive state configured grant configuration) may comprise a time alignment timer value for inactive state configured grant (e.g., CG type 1) usage, one or more parameters used to validate Timing Advance and/or Timing Alignment (TA) in inactive state, a number used for implicit release (e.g., a number of consecutive occasions that can be skipped before implicit release) of configured grant (e.g., CG type 1) in inactive state, a RNTI used in inactive state, and/or a window size to be monitored in inactive state.

The UE uses (and/or applies) the connected mode configured grant (e.g., CG type 1) configuration if the UE is in connected mode. The UE uses (and/or applies) the inactive state configured grant (e.g., CG type 1) configuration if the UE is in inactive state (and/or when Timing Advance and/or Timing Alignment (TA) associated with the inactive state configured grant (e.g., CG type 1) configuration is valid). The UE may not use (and/or apply) the connected mode configured grant (e.g., CG type 1) configuration if the UE is in inactive state. The UE may not use (and/or apply) the inactive state configured grant (e.g., CG type 1) configuration if the UE is in connected mode.

In some examples, the UE may be a NR light device (and/or a reduced capability NR device). Alternatively and/or additionally, the UE may be a stationary device. Alternatively and/or additionally, the UE may not have mobility capability. Alternatively and/or additionally, the UE may have low mobility capability.

In some examples, the network may be a network node. Alternatively and/or additionally, the network node may control a serving cell of a UE. In some examples, the serving cell may be PCell. Alternatively and/or additionally, the serving cell may be SCell. Alternatively and/or additionally, the network node may control a cell group of a UE. In some examples, the cell group may be MCG. Alternatively and/or additionally, the cell group may be SCG.

In some examples, one or more techniques, methods and/or operations of the present disclosure, described with respect to inactive state may also be applied to idle mode (or RRC_IDLE state). For example, "inactive state" in the present disclosure may be changed to "idle mode" (or "RRC_IDLE state"). In some examples, one or more techniques, methods and/or operations of the present disclosure may be applied to both idle mode and inactive state. Alternatively and/or additionally, one or more techniques, methods and/or operations of the present disclosure may be applied to idle mode but not applied to inactive state.

One, some and/or all of the foregoing techniques and/or embodiments can be formed to a new embodiment.

In some examples, embodiments disclosed herein may be implemented independently and/or separately. Alternatively and/or additionally, a combination of embodiments described herein may be implemented. Alternatively and/or additionally, a combination of embodiments described herein may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 14:
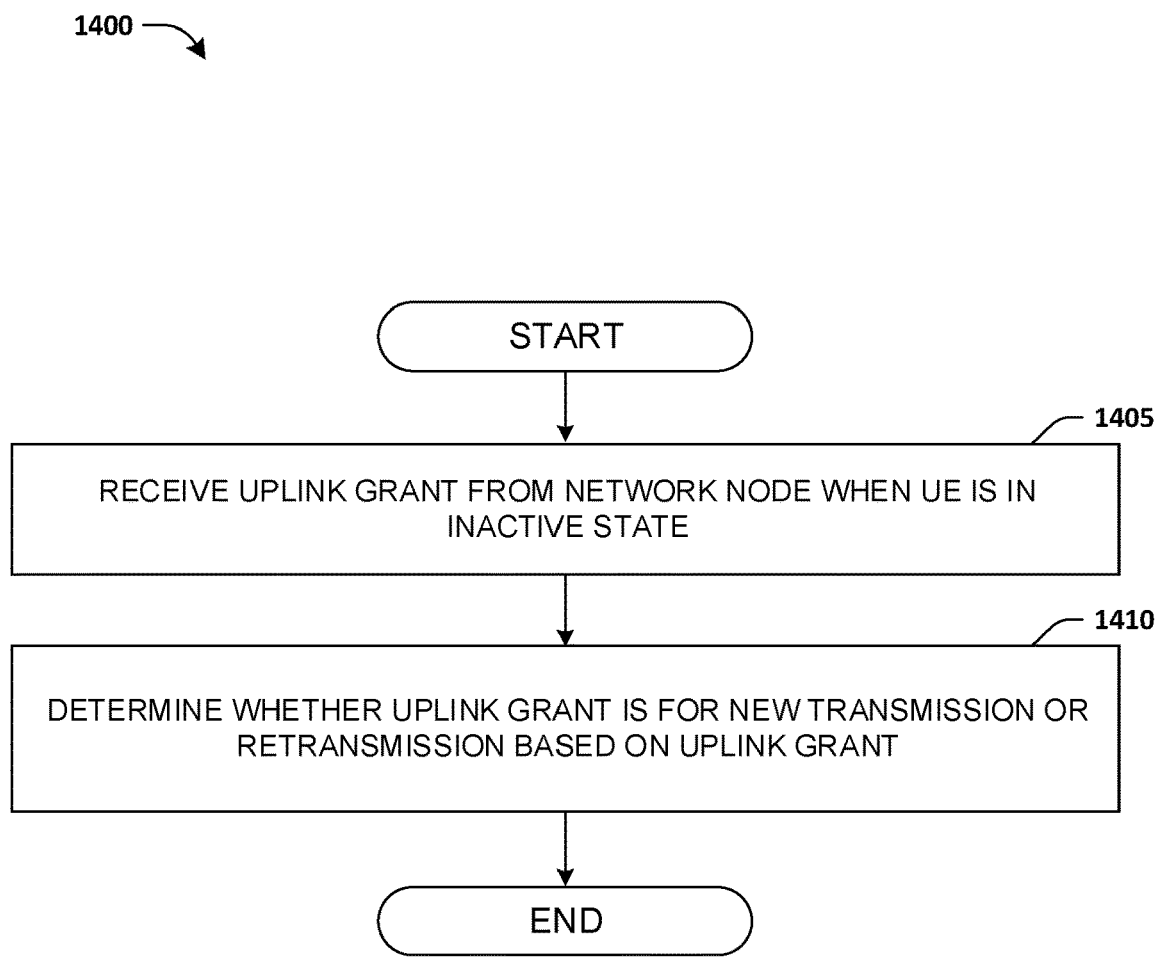
FIG. 14 is a flow chart according to one exemplary embodiment.

FIG. 14 is a flow chart 1400 according to one exemplary embodiment from the perspective of a UE. In step 1405, the UE receives an uplink grant from a network node when the UE is in inactive state. In step 1410, the UE determines whether the uplink grant is for a new transmission or a retransmission based on the uplink grant.

Referring back to FIGS. 3 and 4, in one exemplary embodiment of a UE, the device 300 includes a program code 312 stored in the memory 310. The CPU 308 could execute program code 312 to enable the UE (i) to receive an uplink grant from a network node when the UE is in inactive state, and (ii) to determine whether the uplink grant is for a new transmission or a retransmission based on the uplink grant. Furthermore, the CPU 308 can execute the program code 312 to perform one, some and/or all of the above-described actions and steps and/or others described herein.

Figure 15:
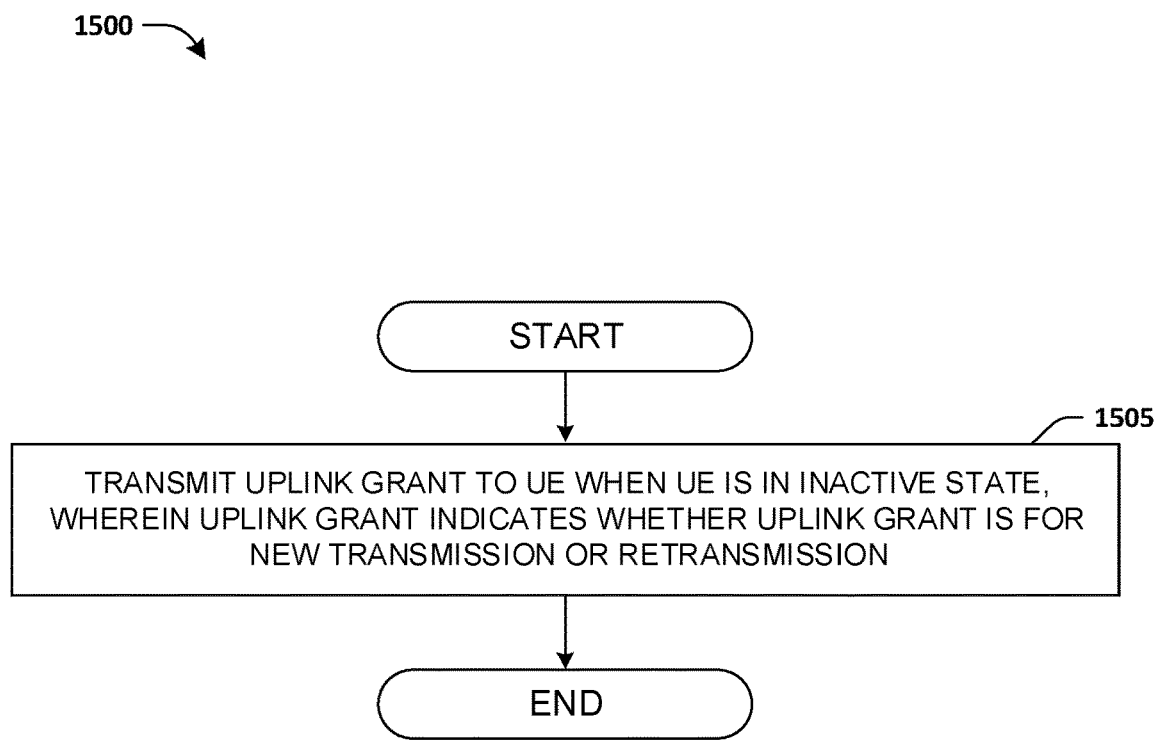
FIG. 15 is a flow chart according to one exemplary embodiment.

FIG. 15 is a flow chart 1500 according to one exemplary embodiment from the perspective of a network node. In step 1505, the network node transmits an uplink grant to a UE when the UE is in inactive state, wherein the uplink grant indicates whether the uplink grant is for a new transmission or a retransmission. For example, the network node indicates, via the uplink grant, whether the uplink grant is for a new transmission or a retransmission. For example, the network node may generate the uplink grant such that the uplink grant is indicative of whether the uplink grant is for a new transmission or a retransmission.

Referring back to FIGS. 3 and 4, in one exemplary embodiment of a network node, the device 300 includes a program code 312 stored in the memory 310. The CPU 308 could execute program code 312 to enable the network node (i) to transmit an uplink grant to a UE when the UE is in inactive state, wherein the uplink grant indicates whether the uplink grant is for a new transmission or a retransmission. Furthermore, the CPU 308 can execute the program code 312 to perform one, some and/or all of the above-described actions and steps and/or others described herein.

With respect to FIGS. 14-15, in one embodiment, the new transmission is a dynamically scheduled transmission.

In one embodiment, the retransmission is a retransmission of a first transmission.

In one embodiment, the first transmission is performed by the UE before the UE receives the uplink grant.

In one embodiment, the first transmission is a configured scheduled transmission.

In one embodiment, the first transmission is a dynamically scheduled transmission.

In one embodiment, the dynamic scheduled transmission is a transmission scheduled by a dynamic uplink grant.

In one embodiment, the configured scheduled transmission is a transmission scheduled by a configured uplink grant.

In one embodiment, if the UE determines that the uplink grant is for a new transmission, the UE uses the uplink grant for a new transmission (e.g., the UE performs a new transmission using the uplink grant).

In one embodiment, if the UE determines that the uplink grant is for a retransmission, the UE uses the uplink grant for a retransmission (e.g., the UE performs a retransmission using the uplink grant).

In one embodiment, an indication in the uplink grant is used (by the UE, for example) to determine whether the uplink grant is for a new transmission or a retransmission.

In one embodiment, the indication set to (and/or indicative of and/or equal to) a first value indicates that the uplink grant is for a new transmission.

In one embodiment, the indication set to (and/or indicative of and/or equal to) a second value indicates that the uplink grant is for a retransmission.

In one embodiment, the indication is a NDI.

In one embodiment, the indication is included in DCI of the uplink grant.

In one embodiment, the indication is included in HARQ information of the uplink grant.

In one embodiment, the indication is signaled via PDCCH (e.g., the UE may receive the indication via PDCCH).

In one embodiment, the uplink grant is addressed to a RNTI (e.g., a specific RNTI, such as a first RNTI).

In one embodiment, the RNTI to which the uplink grant is addressed is used (by the UE, for example) to determine whether the uplink grant is for a new transmission or a retransmission (e.g., which RNTI the uplink grant is addressed to is used to determine whether the uplink grant is for a new transmission or a retransmission).

In one embodiment, the uplink grant being addressed to a first RNTI of the UE indicates that the uplink grant is for a new transmission.

In one embodiment, the uplink grant being addressed to a second RNTI of the UE indicates that the uplink grant is for a retransmission.

In one embodiment, a first field in the uplink grant is set to (and/or indicative of and/or equal to) a value (e.g., a fixed value).

In one embodiment, the first field is NDI.

In one embodiment, the first field is included in DCI of the uplink grant.

In one embodiment, the first field is included in HARQ information of the uplink grant.

In one embodiment, the first field is signaled via PDCCH (e.g., the UE may receive the first field via PDCCH).

In one embodiment, the first RNTI is applicable in connected mode and inactive state (e.g., the first RNTI may be used and/or applied when the UE is in connected mode and when the UE is in inactive state).

In one embodiment, the second RNTI is applicable in connected mode and inactive state (e.g., the second RNTI may be used and/or applied when the UE is in connected mode and when the UE is in inactive state).

In one embodiment, the UE is a NR light device (and/or a reduced capability NR device).

In one embodiment, the UE is a stationary device.

In one embodiment, the UE does not have mobility capability.

In one embodiment, the UE has low mobility capability (e.g., lower than a threshold mobility capability).

In one embodiment, the UE has mobility capability.

Figure 16:
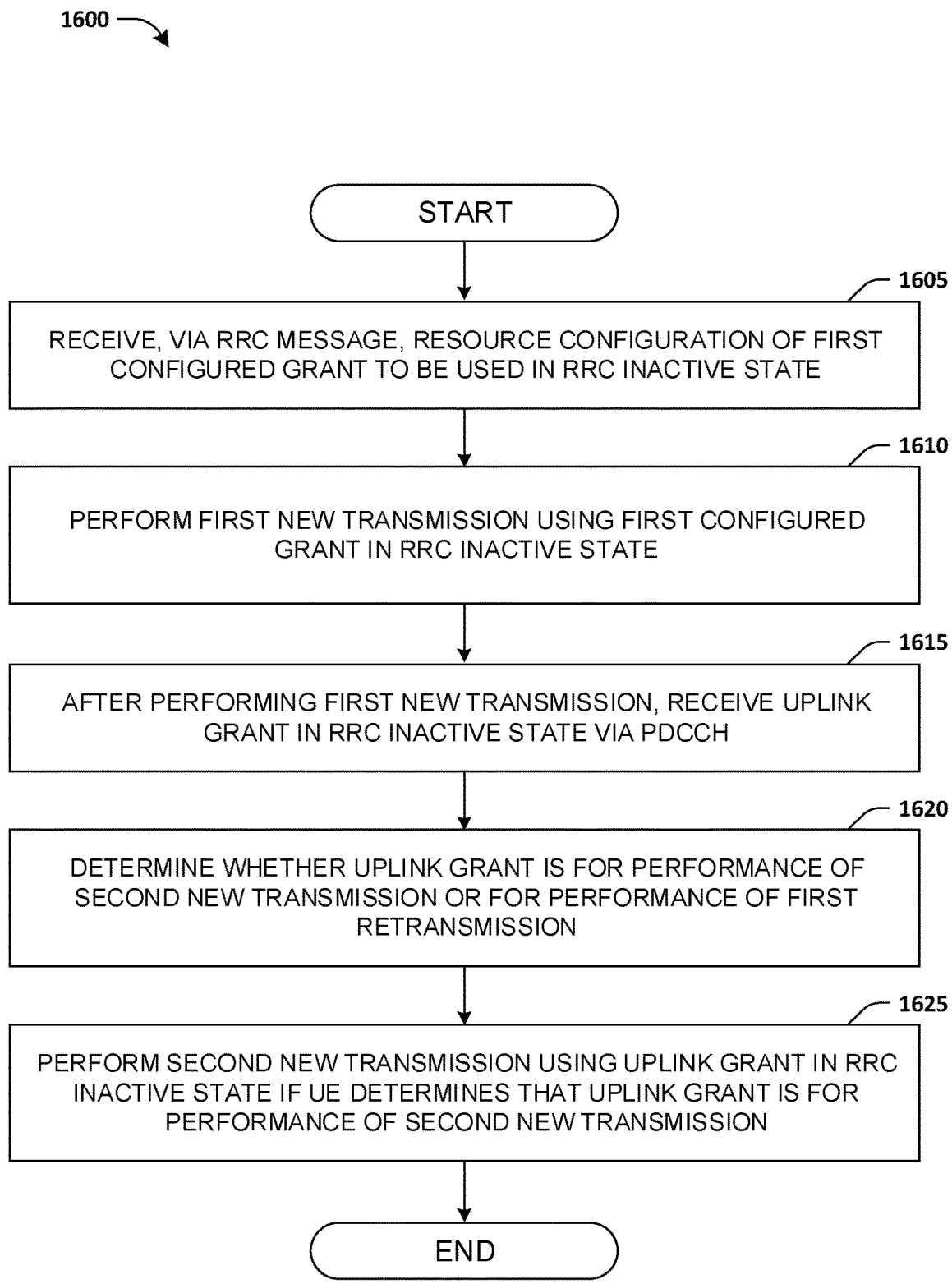
FIG. 16 is a flow chart according to one exemplary embodiment.

FIG. 16 is a flow chart 1600 according to one exemplary embodiment from the perspective of a UE. In step 1605, the UE receives, via a RRC message, a resource configuration of a first configured grant to be used in RRC inactive state (e.g., RRC_INACTIVE state). For example, the first configured grant may be for use by the UE when the UE is in RRC inactive state. In step 1610, the UE performs a first new transmission using the first configured grant in RRC inactive state (e.g., the first new transmission may be performed when the UE is in RRC inactive state). In step 1615, after performing the first new transmission, the UE receives an uplink grant in RRC inactive state via PDCCH (e.g., the UE may receive the uplink grant via PDCCH when the UE is in RRC inactive state). In step 1620, the UE determines whether the uplink grant is for performance of a second new transmission or for performance of a first retransmission. In step 1625, the UE performs the second new transmission using the uplink grant in RRC inactive state if the UE determines that the uplink grant is for the second new transmission (e.g., the second new transmission may be performed using the uplink grant when the UE is in RRC inactive state if the UE determines that the uplink grant is for the second new transmission). For example, the UE may perform the second new transmission using the uplink grant in RRC inactive state based on a determination that the uplink grant is for performance of the second new transmission.

In one embodiment, the UE determines whether the uplink grant is for performance of the second new transmission or for performance of the first retransmission based on an indication in the uplink grant (and/or based on other information in addition to the indication in the uplink grant).

In one embodiment, the indication is a NDI.

In one embodiment, the indication being set to (and/or indicative of and/or equal to) a first value indicates that the uplink grant is for the second new transmission, and the indication being set to (and/or indicative of and/or equal to) a second value indicates that the uplink grant is for the first retransmission.

In one embodiment, the UE determines that the uplink grant is for performance of the second new transmission if the indication is set to a first value. The UE determines that the uplink grant is for performance of the first retransmission if the indication is set to a second value.

In one embodiment, the UE determines whether the uplink grant is for performance of the second new transmission or for performance of the first retransmission based on whether the indication is set to a first value indicative of the uplink grant being for performance of the second new transmission or a second value indicative of the uplink grant being for performance of the first retransmission. The UE may determine that the uplink grant is for performance of the second new transmission based on a determination that the indication is set to the first value.

In one embodiment, the uplink grant is for the second new transmission if the indication is considered toggled, and the uplink grant is for the retransmission if the indication is considered not toggled. Whether the indication is to be considered toggled or considered not toggled may be determined using one or more of the techniques presented herein.

In one embodiment, the UE determines that the uplink grant is for performance of the second new transmission if the indication is considered to be toggled. The UE determines that the uplink grant is for performance of the first retransmission if the indication is considered to be not toggled. Whether the indication is to be considered toggled or considered not toggled may be determined using one or more of the techniques presented herein.

In one embodiment, the UE determines whether the uplink grant is for performance of the second new transmission or for performance of the first retransmission based on whether the indication is considered to be toggled or not toggled. Whether the indication is to be considered toggled or considered not toggled may be determined using one or more of the techniques presented herein. The UE may determine that the uplink grant is for performance of the second new transmission based on a determination that the indication is considered to be toggled.

In one embodiment, the determining whether the uplink grant is for performance of the second new transmission or for performance of the first retransmission is based on a RNTI to which the uplink grant is addressed.

In one embodiment, the uplink grant being addressed to a first RNTI indicates that the uplink grant is for the second new transmission, and the uplink grant being addressed to a second RNTI indicates that the uplink grant is for the retransmission.

In one embodiment, the UE determines that the uplink grant is for performance of the second new transmission if the RNTI is a first RNTI. The UE determines that the uplink grant is for performance of the first retransmission if the RNTI is a second RNTI.

In one embodiment, the UE determines whether the uplink grant is for performance of the second new transmission or for performance of the first retransmission based on whether the RNTI is a first RNTI indicative of the uplink grant being for performance of the second new transmission or a second RNTI indicative of the uplink grant being for performance of the first retransmission. The UE may determine that the uplink grant is for performance of the second new transmission based on a determination that the RNTI is the first RNTI.

In one embodiment, the uplink grant being addressed to a first RNTI indicates that the uplink grant is for a new dynamic scheduled transmission or a retransmission of the new dynamic scheduled transmission, and the uplink grant being addressed to a second RNTI indicates that the uplink grant is for a retransmission of a configured transmission.

In one embodiment, the RNTI indicates that the uplink grant is for a new dynamic scheduled transmission or a retransmission of the new dynamic scheduled transmission if the RNTI is a first RNTI. The RNTI indicates that the uplink grant is for a retransmission of a configured transmission if the RNTI is a second RNTI.

In one embodiment, the UE determines whether the uplink grant is for performance of the second new transmission or for performance of the first retransmission based on whether the RNTI is a first RNTI, indicative of the uplink grant being for performance of a new dynamic scheduled transmission or a retransmission of a dynamic scheduled transmission, or the RNTI is a second RNTI indicative of the uplink grant being for performance of a retransmission of a configured transmission. The UE may determine that the uplink grant is for performance of the second new transmission based on an indication in the uplink grant and a determination that the RNTI is the first RNTI. The second new transmission corresponds to the new dynamic scheduled transmission. In some examples, the indication may be a NDI. The UE may determine that the uplink grant is for performance of the second new transmission (e.g., the new dynamic scheduled transmission) based on the uplink grant being addressed to the first RNTI and the indication being set to a first value. Alternatively and/or additionally, UE may determine that the uplink grant is for performance of the second new transmission (e.g., the new dynamic scheduled transmission) based on the uplink grant being addressed to the first RNTI and the indication being considered toggled.

In one embodiment, the RNTI to which the uplink grant is addressed is determined based on the uplink grant. For example, the uplink grant may comprise an indication of the RNTI.

In one embodiment, the new dynamic scheduled transmission corresponds to a new transmission using a dynamic grant, and the configured transmission corresponds to a new transmission (e.g., the first new transmission) using a configured grant (e.g., the first configured grant).

In one embodiment, the first new transmission corresponds to a new transmission of a first MAC PDU. The second new transmission corresponds to a new transmission of a second MAC PDU (different than the first MAC PDU, for example). The first retransmission corresponds to a retransmission of the first MAC PDU.

In one embodiment, a new transmission, such as the first new transmission and/or the second new transmission, corresponds to a transmission of data (e.g., a MAC PDU) that is not a retransmission of the data. For example, a new transmission may correspond to an initial transmission of data (e.g., a MAC PDU) after the data becomes available for transmission (at the UE, for example).

Referring back to FIGS. 3 and 4, in one exemplary embodiment of a UE, the device 300 includes a program code 312 stored in the memory 310. The CPU 308 could execute program code 312 to enable the UE (i) to receive, via a RRC message, a resource configuration of a first configured grant to be used in RRC inactive state, (ii) to perform a first new transmission using the first configured grant in RRC inactive state, (iii) after performing the first new transmission, to receive an uplink grant in RRC inactive state via PDCCH, (iv) to determine whether the uplink grant is for performance of a second new transmission or for performance of a first retransmission, and (v) to perform the second new transmission using the uplink grant in RRC inactive state if the UE determines that the uplink grant is for the second new transmission. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 14-16. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 14-16, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). The increased efficiency may be a result of enabling and/or providing support for a UE to determine whether an uplink grant is for a new transmission or for a retransmission, and/or enabling and/or providing support for the UE to perform small data transmission and/or subsequent data transmission when the UE is in inactive state (e.g., the subsequent data transmission may comprise one or more new transmissions after an initial new transmission in inactive state).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
   receiving, via a Radio Resource Control (RRC) message, a resource configuration of a first configured grant to be used in RRC inactive state;
   performing a first new transmission using the first configured grant in RRC inactive state;
   receiving, after the performing the first new transmission using the first configured grant, an uplink grant, associated with a Hybrid Automatic Repeat Request (HARQ) process, in RRC inactive state via Physical Downlink Control Channel (PDCCH); and
   performing a second new transmission using the uplink grant in RRC inactive state if the uplink grant is addressed to a first Radio Network Temporary Identifier (RNTI) and a new data indicator (NDI) for the HARQ process associated with the uplink grant addressed to the first RNTI is toggled, or performing a first retransmission using the uplink grant in RRC inactive state if the uplink grant is addressed to a second RNTI and the NDI for the HARQ process associated with the uplink grant addressed to the second RNTI is not toggled.

2. The method of claim 1, wherein:
   the HARQ process is configured for performing the first new transmission.

3. The method of claim 1, wherein:
   determining whether the uplink grant is for performance of the second new transmission or for performance of the first retransmission comprises determining that the uplink grant is for performance of the second new transmission if the NDI is considered to be toggled; and
   the determining whether the uplink grant is for performance of the second new transmission or for performance of the first retransmission comprises determining that the uplink grant is for performance of the first retransmission if the NDI is considered to be not toggled.

4. The method of claim 1, wherein the first RNTI is Cell RNTI (C-RNTI) and the second RNTI is Configured Scheduling RNTI (CS-RNTI).

5. The method of claim 1, wherein:
   the uplink grant is for performance of a new dynamic scheduled transmission or a retransmission of a dynamic scheduled transmission if the uplink grant is addressed to the first RNTI; and
   the uplink grant is for performance of a retransmission of a configured transmission if the uplink grant is addressed to the second RNTI.

6. The method of claim 5, wherein:
   the new dynamic scheduled transmission corresponds to a new transmission using a dynamic grant; and
   the configured transmission corresponds to a new transmission using a configured grant.

7. The method of claim 1, wherein:
the first new transmission corresponds to a new transmission of a first Medium Access Control Protocol Data Unit (MAC PDU);
the second new transmission corresponds to a new transmission of a second MAC PDU; and
the first retransmission corresponds to a retransmission of the first MAC PDU.

8. The method of claim 1, wherein
the first RNTI is used in RRC connected mode and is reused in RRC inactive state and the second RNTI is configured in RRC connected mode and is to be used in RRC inactive state.

9. A User Equipment (UE) comprising:
a control circuit;
a processor installed in the control circuit; and
a memory installed in the control circuit and operatively coupled to the processor, wherein the processor is configured to execute a program code stored in the memory to perform operations, the operations comprising:
receiving, via a Radio Resource Control (RRC) message, a resource configuration of a first configured grant to be used in RRC inactive state;
performing a first new transmission using the first configured grant in RRC inactive state;
receiving, after the performing the first new transmission using the first configured grant, an uplink grant, associated with a Hybrid Automatic Repeat Request (HARQ) process, in RRC inactive state via Physical Downlink Control Channel (PDCCH); and
performing a second new transmission using the uplink grant in RRC inactive state the uplink grant is addressed to a first Radio Network Temporary Identifier (RNTI) and a new data indicator (NDI) for the HARQ process associated with the uplink grant addressed to the first RNTI is toggled, or performing a first retransmission using the uplink grant in RRC inactive state if the uplink grant is addressed to a second RNTI and the NDI for the HARQ process associated with the uplink grant addressed to the second RNTI is not toggled.

10. The UE of claim 9, wherein:
the HARQ process is configured for performing the first new transmission.

11. The UE of claim 9, wherein:
the determining whether the uplink grant is for performance of the second new transmission or for performance of the first retransmission is based on whether the NDI is considered to be toggled or not toggled; and
the determination that the uplink grant is for performance of the second new transmission is based on a determination that the NDI is considered to be toggled.

12. The UE of claim 9, wherein:
determining whether the uplink grant is for performance of the second new transmission or for performance of the first retransmission is based on whether the uplink grant is addressed to the first RNTI indicative of the uplink grant being for performance of the second new transmission or the second RNTI indicative of the uplink grant being for performance of the first retransmission; and
the determination that the uplink grant is for performance of the second new transmission is based on a determination that the uplink grant is addressed to the first RNTI.

13. The UE of claim 9, wherein the first RNTI is Cell RNTI (C-RNTI) and the second RNTI is Configured Scheduling RNTI (CS-RNTI).

14. The UE of claim 9, wherein:
the first new transmission corresponds to a new transmission of a first Medium Access Control Protocol Data Unit (MAC PDU);
the second new transmission corresponds to a new transmission of a second MAC PDU; and
the first retransmission corresponds to a retransmission of the first MAC PDU.

15. The UE of claim 9, wherein
the first RNTI is used in RRC connected mode and is reused in RRC inactive state and the second RNTI is configured in RRC connected mode and is to be used in RRC inactive state.

16. A method of a User Equipment (UE), the method comprising:
receiving, via a Radio Resource Control (RRC) message, a resource configuration of a first configured grant to be used in RRC inactive state;
performing a first new transmission using the first configured grant in RRC inactive state;
receiving, after the performing the first new transmission using the first configured grant, an uplink grant, associated with a Hybrid Automatic Repeat Request (HARQ) process, in RRC inactive state via Physical Downlink Control Channel (PDCCH);
determining a Radio Network Temporary Identifier (RNTI) to which the uplink grant is addressed, wherein the RNTI is a Cell RNTI (C-RNTI) or a Configured Scheduling RNTI (CS-RNTI), wherein the C RNTI was used in RRC connected mode and is reused in RRC inactive state and the CS-RNTI was configured in RRC connected mode and is used in RRC inactive state;
determining, based on the RNTI to which the uplink grant is addressed, whether the uplink grant received after the performing the first new transmission using the first configured grant is for performance of a second new transmission or for performance of a first retransmission; and
performing the second new transmission using the uplink grant in RRC inactive state if the UE determines that the uplink grant is for performance of the second new transmission.

17. The method of claim 16, wherein:
the determining whether the uplink grant is for performance of the second new transmission or for performance of the first retransmission is based on a new data indicator (NDI) in the uplink grant.

18. The method of claim 17, wherein:
the determining whether the uplink grant is for performance of the second new transmission or for performance of the first retransmission comprises determining that the uplink grant is for performance of the second new transmission if the NDI is considered to be toggled; and
the determining whether the uplink grant is for performance of the second new transmission or for performance of the first retransmission comprises determining that the uplink grant is for performance of the first retransmission if the NDI is considered to be not toggled.

19. The method of claim 16, wherein:
the determining whether the uplink grant is for performance of the second new transmission or for performance of the first retransmission comprises determining that the uplink grant is for performance of the second new transmission if the RNTI is the C-RNTI; and the determining whether the uplink grant is for performance of the second new transmission or for performance of the first retransmission comprises determining that the uplink grant is for performance of the first retransmission if the RNTI is the CS-RNTI.

20. The method of claim 16, wherein:

the RNTI indicates that the uplink grant is for performance of a new dynamic scheduled transmission or a retransmission of a dynamic scheduled transmission if the RNTI is the C-RNTI; and the RNTI indicates that the uplink grant is for performance of a retransmission of a configured transmission if the RNTI is the CS-RNTI.

21. The method of claim 16, wherein the HARQ process is configured for performing the first new transmission.

* * * * *